US006863917B2

(12) United States Patent
Redding, Jr. et al.

(10) Patent No.: US 6,863,917 B2
(45) Date of Patent: Mar. 8, 2005

(54) READY-TO-USE FOOD PRODUCT

(76) Inventors: Bruce K. Redding, Jr., 1 Kathryn La., Broomall, PA (US) 19008; Ram B. Roy, 34 Hunt Club Dr., Collegeville, PA (US) 19426

( * ) Notice: Subject to any disclaimer, the term of this patent is extended or adjusted under 35 U.S.C. 154(b) by 42 days.

(21) Appl. No.: 09/921,980

(22) Filed: Aug. 3, 2001

(65) Prior Publication Data

US 2002/0064587 A1 May 30, 2002

Related U.S. Application Data

(60) Provisional application No. 60/289,577, filed on May 8, 2001, and provisional application No. 60/223,259, filed on Aug. 3, 2000.

(51) Int. Cl.[7] .............................................. A21D 10/00
(52) U.S. Cl. ......................... 426/552; 426/94; 426/99; 426/128; 426/391; 426/397; 426/549; 426/553
(58) Field of Search ........................ 426/552, 94, 128, 426/549, 553, 397, 391, 99, 120

(56) References Cited

U.S. PATENT DOCUMENTS

| 4,022,917 A | 5/1977 | Selenke | 426/331 |
|---|---|---|---|
| 4,313,967 A | 2/1982 | Kahn et al. | 426/327 |
| 4,668,519 A | 5/1987 | Dartey et al. | 426/548 |
| 5,045,333 A | * 9/1991 | Petrofsky et al. | 426/128 |
| 5,057,330 A | 10/1991 | Lee et al. | 426/120 |
| 5,091,200 A | 2/1992 | Kang et al. | 426/243 |
| 5,409,720 A | 4/1995 | Kent et al. | 426/128 |
| 5,518,744 A | * 5/1996 | Kaeser et al. | 426/90 |
| 5,562,938 A | 10/1996 | Lee et al. | 426/106 |
| 5,855,945 A | 1/1999 | Laughlin et al. | 426/549 |
| 5,882,712 A | 3/1999 | Wu | 426/551 |
| 5,962,052 A | * 10/1999 | Acknin et al. | 426/128 |
| 6,013,294 A | * 1/2000 | Bunke et al. | 426/128 |
| 6,149,953 A | 11/2000 | Redding, Jr. | 426/98 |
| 6,165,524 A | * 12/2000 | Narayanaswamy et al. | 426/128 |
| 6,217,929 B1 | 4/2001 | Hahn | 426/549 |
| 6,224,924 B1 | 5/2001 | Narayanaswamy et al. | 426/128 |
| 6,224,925 B1 | 5/2001 | Narayanaswamy et al. | 426/128 |
| 6,228,403 B1 | 5/2001 | Narayanaswamy et al. | 426/128 |
| 6,261,613 B1 | 7/2001 | Narayanaswamy et al. | 426/94 |

* cited by examiner

Primary Examiner—Lien Tran
(74) Attorney, Agent, or Firm—Reed Smith LLP; John W. Goldschmidt, Jr.

(57) ABSTRACT

A ready-to-use food product, and method for preparing the same. The product includes: a batter; at least one leavening agent; and, at least one oil. The oil separates the batter and leavening agent while in storage in a container, and agitation of the container causes the batter, leavening agent and oil to at least partially mix.

43 Claims, 5 Drawing Sheets

READY-TO-USE FOOD PRODUCT

RELATED APPLICATIONS

This application claims priority of U.S. patent application Ser. No. 60/223,259, filed Aug. 3, 2000, entitled "READY TO USE LIQUID BATTER" and U.S. patent application Ser. No. 60/289,577, filed May 8, 2001, entitled "LIQUID BATTER".

FIELD OF INVENTION

The present invention generally relates to culinary or food products, and more particular to ready-to-use food products, such as liquid batter or dough.

BACKGROUND OF INVENTION

Food preservation is an important consideration in the packaging of many food products. For example, it is often important, that for a food product which may be susceptible to spoilage through bacterial and/or mold growth, and which is intended to be consumed more than a few days after packaging, that steps be taken to inhibit microbial growth, e.g., spoilage bacteria and mold growth in the packaged product. It has long been recognized that techniques such as freezing, retort canning and preservation through the addition of chemical biostatic and fungistatic agents can, in many cases, be employed with satisfactory results.

However, as is well known, freezing requires substantially constant refrigeration from the time of packaging until the time of consumption. Further, some products do not lend themselves well to freezing without some change in the properties of the product. Further yet, required thawing of a product may be inconvenient or undesirable.

The process of retort canning involves heating of the product at the time of retort canning or packaging to destroy a significant amount of bacteria and molds in the product and, thus, render the product substantially sterile. Usually, such products are first packaged or canned, and then the container is heated to some temperature for a specified period of time. Recognized limitations of this process reside in that it is not suitable for use with products which do not tolerate these high temperatures well. For example, certain products may cook at the sterilizing temperatures. Thus, in some cases, retort canning may not be desirable for certain food products, particularly in cases in which the product is a batter, or the like, which is intended to be cooked immediately prior to consumption, for example. In other cases, it may not be desirable to cook the product at all.

As set forth, the addition of chemical additives to the product can, in some cases, be effective to inhibit the growth of the bacteria and mold. However, certain food products possess chemical properties which may be inconsistent with the conditions under which biostatic and fungistatic agents are effective. For example, it is known that certain agents work more effectively when a food product is maintained at a low pH level. However, in many cases a low pH level cannot be reasonably maintained in a food product due to inter-reaction of the ingredients of the product with acid. This is particularly true with premixed batters used to prepare baking products such as bread, biscuits, pancakes, and the like, for example. These products use a leavening agent, which generally cannot exist in a low pH solution without prematurely reacting with the acid of the solution.

For example, U.S. Pat. No. 2,810,650, issued Oct. 22, 1957, entitled "Refrigeration of Doughs and Batters Including as a Leavening Component Dicalcium Phosphate Dihydrate" (Joslin), U.S. Pat. No. 3,275,451, issued Sep. 27, 1966, entitled "Alpha-Glucoheptono Gamma-Lactone Containing Premix for Leavened Baked Food Products" (Holstein) and U.S. Pat. No. 3,170,795, issued Feb. 23, 1965, entitled "Culinary Mix for Producing Chemically Leavened Baked Goods" (Andre) disclose that leavening action results from the reaction of an acidulant in the presence of a gas-producing compound. It is also appreciated by these patents that premature leavening of such compositions is to be avoided. These patents suggest the incorporation of an acidulant whose acidity is activated by the baking temperature for reaction with the gas producing bicarbonate. The delayed acting acidulants disclosed are dicalcium phosphate dihydrate, alpha-glucoheptono-gamma-lactone and glucono-delta-lactone. U.S. Pat. No. 3,021,220, issued Feb. 13, 1962, entitled "Prepared Batters" (Going) similarly discloses that gas-producing chemical leavening agents should not be added to batters prior to the heating step, and if used, should preferably be added just prior to the baking of the batters by the ultimate consumer. U.S. Pat. No. 328,419, issued Oct. 13, 1885, entitled "Baking-Powder" (Marsh) discloses an acid lactate baking powder in which the acid and alkaline salts are protected from reaction during storage by the presence of a fatty material. U.S. Pat. No. 1,264,592, issued Apr. 30, 1918, entitled "Baking-Powder and Process of Making Same" (Atkinson) also suggests prevention of pre-reaction of baking powder by fatty separation of components.

In commercial baking, batters and doughs are often formulated by hundreds, if not thousands of pounds. As with any food product, doughs and the resulting cooked or baked goods have organoleptic properties, which are based upon the dough formula, thorough mixing, uniform distribution of dough components, and uniformity of physical properties within the dough. Uneven or a lack of full mixing may affect taste, texture, and mouthfeel of the dough, for example. Nonuniform dough mixing may also result in a variance in dough can pressure and, in turn, decreased shelf stability, and reduced performance of the eventual food product.

Another problem faced in the production or formulation of dough is that the viscoelastic properties of dough may change as the dough continues to develop and build viscosity. Minor ingredients or constituents, which are placed into the dough in smaller concentrations, often have important roles in contributing organoleptic properties to the dough. However, these same constituents are often the most difficult to mix homogeneously within the developing dough. For example, leavening agents may be incorporated in refrigerated doughs. The type, quantity, and combination of leavening agent is tailored to each product to give optimum volume, texture, performance and quality.

Typically, doughs are prepared by mixing flour, water and dough-developing agents in a first cycle. Minor ingredients, including leavening agents for example, are added to the developing dough in a second cycle. The first cycle is generally intended to provide a peak viscosity and is generally the longest period in dough mixing. The development of a peak viscosity is important to the commercial production of large volumes of doughs and baked goods.

In order to maintain the efficiency of the dough formulation process, the second cycle often takes place over a relatively shorter period of time. As a result, minor ingredients such as leaveners, flavors and nutrients may be mixed throughout the dough in a manner which is less than completely homogenous, and the dough may have uneven concentrations of leavener dispersed throughout the dough matrix.

Problems which may occur when the dough ingredients are not thoroughly mixed include less than adequate proofing and low specific volumes in final baked goods, for example. Commercial doughs are typically packaged in cans for example, so a lack of uniform mixing can result in some cans having too much leavening, and therefore an excessively high can pressure, and other cans having too little leavening, and therefore an excessively low can pressure. If the can pressure is too high the can might burst, leading to unusable product. If the can pressure is too low, the dough might not be shelf stable, and might spoil because there was insufficient pressure to expel all of the oxygen from the can. A non-uniform distribution of ingredients may also result in non-uniform final products or a final product with a lower specific volume.

To insure the even distribution of ingredients within the dough, a manufacturer may have to extend the amount of time the ingredients are mixed. This can result in an increased production time, decreased output capacity and, therefore, decreased manufacturing efficiency. Longer mixing times may also cause the dough to attain a viscosity beyond its peak viscosity, adversely affecting the dough's viscoelastic properties.

Prior disclosures concerning dough formulations include U.S. Pat. No. 3,620,763, issued Nov. 16, 1971, entitled "Refrigerated Batter Products and Method for Preparing Same" (Hans), which is directed to a ready-to-bake refrigerator dough, which exhibits stability against microbial growth. Hans teaches the addition of polysaccharide hydrophilic film formers to dough to enhance storage stability. However, Hans does not disclose a method to enhance the uniformity of the ingredients within the dough.

U.S. Pat. No. 4,022,917, issued May 10, 1977, entitled "Process for Preparing a Storage Stable Premixed Batter" (Selenke) teaches maintaining the premixed batter at an acidic pH of about 5 or less to inhibit microbial growth by isolating the acidified batter from the alkaline leavening ingredients of the mixture. To isolate the alkaline leavening agent from the acidified batter, the alkaline leavening agent is encapsulated within a water-insoluble coating that is meltable or heat-dispersible. The coating prevents the alkaline leavening agent from reacting with the acidic leavening agent in the batter until the batter is cooked. An acidic environment inhibits bacterial growth and can enhance the activity of some fungistatic agents. However, Selenke teaches the use of very large microspheres containing sodium bicarbonate. Such capsule sizes may tend to leave brown spots on dough and a poor appearance. In addition, the large size of the microspheres may tend to lead to uneven leavening during the cooking process. Further, many food approved coating materials used in sodium bicarbonate microspheres may tend to develop micro fissures, cracks or to dissolve when stored in the acidified batter over time, causing premature reaction and negating the antimicrobial or fungicidal function of the acid in the batter.

U.S. Pat. No. 5,409,720, issued Apr. 25, 1995, entitled "Room-Temperature Shelf-Stable Dough Mix" (Kent) teaches a dough mix including a moist ingredient portion and a dry ingredient portion capable of being combined to produce complete dough requiring no additional ingredients. The moist ingredient portion includes sugar, shortening and the water or moisture required in the complete dough. The dry ingredient portion includes the flour required in the complete dough and may include leavening agents, egg solids, candy pieces, nuts, dried fruits, coconuts and other dry or moisture-free ingredients. Kent is directed to a method for adding compatible ingredients, but does not offer a totally self-contained shelf stable batter product.

U.S. Pat. No. 5,855,945, issued Jan. 5, 1999, entitled "Method of Preparing Dough" (Laughlin) teaches a means of forming pre-mixed dough whereupon an encapsulated leavening agent is employed in the formulation.

None of these known methods insure that the dough product will have an adequately mixed and shelf stable leavening system though. The use of sodium bicarbonate in an encapsulated form relies upon a capsule shell composed of fats, waxes or hydrogenated vegetable oils. These fats may have acid soluble functional groups. Immersing the encapsulated sodium bicarbonate made from such shell materials may result in low shelf life, as the liquid batter is acidic, kept at a pH of 5.0 to 5.5 for example. At such a range fats, hydrogenated vegetable oils and food approved waxes may tend to slowly disintegrate over time, eventually enabling the acidulant and the bicarbonate to come into direct contact, usually far before the shelf life desired period is reached. The acidic environment of the batter, used to keep microbial growth to a minimum during storage and to affect the chemical leavening reaction during baking, may also cause deterioration of the capsule shell materials used to form encapsulated bicarbonates. This leads to a short shelf life as premature reaction forms carbon dioxide gas and swells the container in which the liquid batter is stored. The premature reaction also minimizes the leavening effect upon baking and can reduce the effectiveness of the batter to act as an antimicrobial composition as the acidulant loses its potency.

As a result, products produced by the methods described above may not be uniform, due to uneven leavening action, suffer a short shelf life, and/or result in a baked good or dough product with poor appearance, uneven shape and/or a poor taste profile.

SUMMARY OF THE INVENTION

A ready-to-cook food product, and method for preparing the same, the product including: a batter; at least one leavening agent; and, at least one oil; wherein, the oil separates the batter and leavening agent while in storage, and agitation of batter, oil and leavening agent causes the batter, leavening agent and oil to at least partially mix.

BRIEF DESCRIPTION OF THE FIGURES

The invention will be better understood with reference to the following illustrative and non-limiting drawings, wherein like references there-throughout identify like elements of the invention, and.

DETAILED DESCRIPTION OF THE PREFERRED EMBODIMENTS

Figure 1:
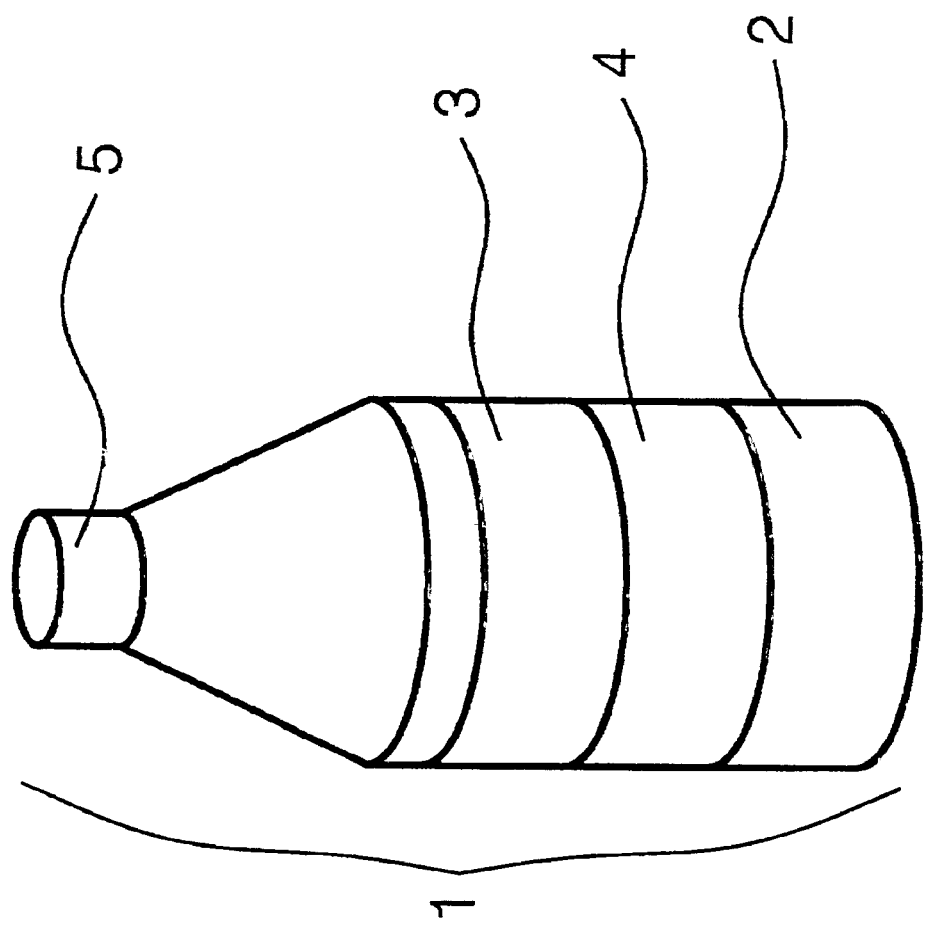
FIG. 1 illustrates a perspective view of a watertight container partially broken away to illustrate a batter according to an aspect of the present invention.

The entire disclosures of both copending U.S. patent application Ser. No. 60/223,259, filed Aug. 3, 2000, entitled "READY TO USE LIQUID BATTER", and copending U.S. patent application Ser. No. 60/289,577, filed May 8, 2001, entitled "LIQUID BATTER" are hereby incorporated by reference, as if being set forth in their respective entireties herein.

It is to be understood that the figures and descriptions of the present invention have been simplified to illustrate elements that are relevant for a clear understanding of the present invention, while eliminating, for purposes of clarity, many other elements and steps that are typically found in preparing a food product. Those of ordinary skill in the art will recognize that other elements and/or steps are desirable and/or required in order to implement the present invention. However, because such elements are well known in the art, and because they do not facilitate a better understanding of the present invention, a discussion of such elements is not provided herein.

According to an aspect of the present invention, there is provided a method for preparing food substances, such as dough and premixed ready to use batter. According to an aspect of the present invention, there is provided a storage-stable batter and method for preparing the same. According to an aspect of the present invention, there is provided a method for making a dough leavened by an acid-alkali system, wherein a batter containing one portion of the leavening system is formed, and then the batter is combined with the other portion of the leavening system and the remaining dough ingredients to make a dough or batter.

According to an aspect of the present invention, there is provided a liquid, ready to use, batter for one handed or single step bake applications to produce baked food products or goods, such as cookies, pies, pancakes, muffins, or brownies, to name just a few. According to an aspect of the present invention, there is provided a liquid batter including flour and other baking ingredients within the batter, an acidulant, base reactant ingredients such as sodium bicarbonate, potassium bicarbonate, ammonium bicarbonate or encapsulated forms of such bicarbonates, and a cooking oil, which also functions as an isolation barrier keeping the acidulant from premature reaction with the bicarbonate until the product is admixed and cooked.

According to an aspect of the present invention, there is provided a premixed batter-like mixture which is stable in storage in its resistance to internal bacteria and mold growth, but which is capable of being used at any time after prolonged storage to form a leavened product. Thus, the invention relates to the preparation of storable aqueous batters, which are ready for cooking by the consumer. The present invention is suitable for use in the preparation of premixed batters or doughs, such as canned pancake batter and the like, which can be stored either under refrigeration or on the shelf at room temperature for an extended time, with resistance to bacteria and fungus growth, but nonetheless which can be immediately used to form leavened pancakes, cakes, the like or other food substances by cooking.

According to an aspect of the invention, a liquid batter premixture is provided, which is chemically and microbiologically stable in a liquid form. According to an aspect of the invention, for use a user need only agitate and cook the storable aqueous batters to make satisfactory leavened products. According to an aspect of the invention, the batter premixtures are storage stable for at least several weeks, and even months, at either room or refrigeration temperatures.

According to an aspect of the present invention, a method of preparing a pre-mixed dough composition involves a method of preparing a dough composition, wherein water, leavening acid, flour and, optionally, minor ingredients are first combined to form an acid batter. The acid batter is then separated from a leavening base within a container by a layer composed of vegetable or cooking oil, to form a dough forming composition, which isolates the acidulated dough composition from reaction with the leavening base until the dough composition is admixed and then cooked.

According to an aspect of the present invention, liquid pre-mixed doughs and batter compositions are provided, wherein the acidulant is separated from the leavening base using an oil isolation barrier between the acidulated dough composition section and the leavening base.

According to an aspect of the present invention, liquid pre-mixed doughs and batter compositions are provided wherein the acidulant is separated from the leavening base by means of an oil isolation barrier between the acidulated dough composition section and the leavening base, wherein the leavening base component is composed of either fully or partially coated or encapsulated sodium bicarbonate or other suitable base.

According to an aspect of the present invention, liquid pre-mixed doughs and batter compositions are provided wherein the acidulant is separated from the leavening base using an oil isolation barrier which is placed above the acidulated dough composition section within a package, and the leavening base is suspended and dispersed within the oil isolation layer, wherein the leavening base component is composed of either fully or partially coated or encapsulated sodium bicarbonate, or raw sodium bicarbonate in a micronized form or other suitable leavening base.

According to an aspect of the present invention, the pre-mixed dough or batter can be used to produce a baked food product such as a pancake, bread, brownie, muffin, cookie, donut, pastry, pie or cake, for example.

According to an aspect of the present invention, a pre-mixed batter is generally maintained at a low acidic pH level, while isolating the acidified batter and the alkaline leavening ingredients of the mixture. According to an aspect of the present invention, a pH is maintained of about 5 or less to inhibit microbial growth although other pH's may be appropriate. According to an aspect of the invention, the quantities of acid and alkaline leavening ingredients in the premixture may be such that, upon leavening, the acid is generally neutralized to a level above a pH of around 5 although other pH's may be appropriate depending upon the ingredients present. According to an aspect of the invention, upon leavening, the acid is neutralized to a level around approximately 6 to 7.

According to an aspect of the present invention, leavening ingredients used may include an alkaline leavening agent such as sodium bicarbonate, which produces gas upon reaction with the acid ingredients of the batter. Such an alkaline leavening agent may be suspended in the batter in small micro-spheres or particles coated or encapsulated in a normally water-insoluble edible material capable of dispersion in said batter at a temperature between a maximum expected storage temperature and a higher cooking temperature, to thereby release the leavening agent during cooking. Such alkaline leavening agents are taught in U.S. Pat. No. 4,022,917, issued May 10, 1977, entitled "PROCESS FOR PREPARING A STORAGE STABLE PREMIXED BATTER", the entire disclosure of which is hereby incorporated by reference herein, for example.

According to an aspect of the present invention, a suitable water insoluble coating material for use may be a fat or shortening, which has a melting point above expected storage temperatures and which softens or disperses an expected temperature, to release the leavening agent for reaction with the acidified batter to produce leavening of the batter, during cooking. In the case of batters, this substance may be used as a coating agent for the alkaline leavening agent, according to an aspect of the invention.

It is believed however that conventional food approved coating materials or encapsulating shell materials made from fats, hydrogenated vegetable oils and food waxes are sensitive to the acidic environment of the acidified batter and readily dissolve or engage in a slow degradation which results in short shelf life and a loss of leavening action upon cooking. According to an aspect of the present invention, to avoid these problems the use of fat coated or encapsulated sodium bicarbonates, immersed directly within the acidified batter is avoided. According to an aspect of the invention, the sodium bicarbonate is isolated from the acidified batter, until needed during the cooking process, through the use of an isolating oil layer within a storage container, or package.

According to an aspect of the present invention, and referring to an illustrative and non-limiting example regarding one embodiment of a pancake batter, a premixed pancake batter is provided with a sufficient quantity of edible acids added thereto, such as a combination of ascorbic, citric and lactic acids, to maintain a pH of the mixture below a level of approximately 5, and preferably about 4 for refrigerator stable batters, and below a level of approximately 4, and preferably about 3.5 for shelf stable batters. As used herein, the term "shelf stable" refers to stability at normal room or ambient temperatures. It is believed that while the effective pH levels may differ for different batter compositions, the pH level for shelf-stable products is preferably approximately 0.5 to 1 pH lower than the level required to maintain the same batter refrigerator stable. By "stable", as used herein, it is meant that the batter will substantially resist spoilage due to appreciable bacterial and/or fungus growth for a period of from day to a few weeks to several months. The low pH level of the batter serves to retard the growth of bacteria and micro-organisms of this nature, while fungus growth is inhibited through the addition of certain known and conventional fungistatic agents, such as sorbic acid, and the like. It is believed that these ingredients are usually more effective in lower pH solutions, and therefore, in the combination of the present invention, their more effective use is provided.

The encapsulation of leavening-producing alkaline ingredients within a substantially water-insoluble coating substance having a melting or aqueous dispersion point between an expected normal storage temperature and an expected cooking temperature permits the mixture of the leavening ingredient into the batter, without affecting the stable properties of the batter, and further allows for reaction of these ingredients upon cooking to both leaven the product and simultaneously raise the pH to a taste acceptable level for consumption.

For liquid batter, sufficient liquid or powder acids may be added so that the liquid batter has a pH range from about 4 to around 5.5. Thus, when the batter is cooked, the fatty substance melts, releasing the alkaline leavening agent to neutralize the acid, thereby releasing carbon dioxide, and leavening the cooked culinary product.

The aforementioned U.S. Pat. No. 4,022,917, teaches that the leavening agent may be suspended in the batter in the form of microspheres, i.e. very small particles. The leavening agent in these spheres is coated with a water-insoluble material, which melts when the batter is heated during cooking to the final product. The encapsulation of the leavening agent in the micro-spheres prevents reaction of the leavening agent with the acidic components of the batter. The micro-spheres are blended in the batter and, if necessary, the batter deaerated. The entire mixture is packaged in a watertight container, such as a pressurized can. However, it is believed that in practice such microspheres tend to dissolve quite readily in an acidified batter. According to an aspect of the present invention, by first treating the coating material, also known as the shell material, under high pressure as described in U.S. Pat. No. 5,209,879, entitled "Method For Inducing Transformations In Waxes", issued May 11, 1993, the shelf life of the encapsulated sodium bicarbonate may be extended, but still may fall short of a desired shelf life period, which can vary from five (5) weeks to as long as several months in either a refrigerated, frozen or room temperature shelf stored condition, for example.

Referring now to the figures, as set forth, like references there-throughout designate like elements of the invention. Referring to FIG. 1, there is shown a perspective view of a watertight container partially broken away to illustrate a batter according to an aspect of the present invention packaged therein. Referring still to FIG. 1, a package design employing the isolated dough or batter mix composition, wherein a sodium bicarbonate leavening base component is placed above an oil isolation layer according to an aspect of the present invention is depicted therein. Referring still to FIG. 1, a pre-packaged, premixed batter, such as the aforementioned pancake batter 2, is illustrated according to an aspect of the present invention. The batter 2 can take the form of a premixed batter containing standard ingredients of a conventional pancake batter, such as flour, eggs, sugar, milk solids, and vegetable oil or shortening. The batter 2 is premixed and partially homogenized.

Referring still to FIG. 1, it illustrates a design employing encapsulated sodium bicarbonate and a modified formulation coupled with a packaging design to provide a liquid ready to use dough or batter composition 2, and which provides anti-microbial action during an extended shelf life, as well as leavening action upon cooking. The package or container 1 may be a plastic container, box, can or other suitable container capable of holding which holds the batter compositions. Within the container 1, the acidified batter 2, together with any flavorings or other ingredients, occupies a lower portion of the container at rest, normally. Cooking oil is placed above the acidified batter 2 within the container 1 and serves as an isolator layer 4 between the acidified batter 2 and sodium bicarbonate microspheres 3, which generally rest above the isolator layer 4. According to an aspect of the present invention, the layer 4 may be directly above the batter 2. The sodium bicarbonate microspheres 3 may be completely encapsulated sodium bicarbonate or partially coated with a water insoluble substance such as a fat, wax or partially hydrogenated vegetable oil, which enables the sodium bicarbonate 3 to become buoyant and float on the surface of the layer 4.

As the oil of layer 4 is suspended, or floats, above an aqueous mix, and the acidified batter 2 is essentially a water based flour mixture, the oil remains generally suspended above and/or not in substantial contact with the batter 2. Thus, the layer 4 helps reduce contact between the sodium bicarbonate microspheres 3 and the acidified batter 2 within the container 1. According to an aspect of the present invention, the sodium bicarbonate microspheres 3 tend to float above the layer 4, provided the core to coating ratio is kept below approximately about 80% active sodium bicarbonate and about 20% fat based coating, for example.

Within the container 1, if the pH within the acidified batter 2 is kept below about 5.5, the batter tends to be resistant to microbial growth. With the sodium bicarbonate 3 at least partially coated and isolated from contact with the acidified batter by the oil isolation layer 4, premature reactions between the alkali base leavening agent and the acidulant within the batter 2 is avoided during storage, thereby considerably extending shelf life for the total composition.

In use, when the container 1 is agitated, the acidified batter 2, oil of layer 4 and floating sodium bicarbonate microspheres 3 tend to right themselves within the container 1 according to their relative specific gravities', and the effect of buoyancy. Further it is believed that contact between the coated sodium bicarbonate 3 and the acidified batter 2 tends not to create an immediate reaction, as there is still a barrier to such reaction in the form of the coating or shell layer over the sodium bicarbonate particle as depicted in FIGS. 4A and 4B, for example.

Figure 4B:
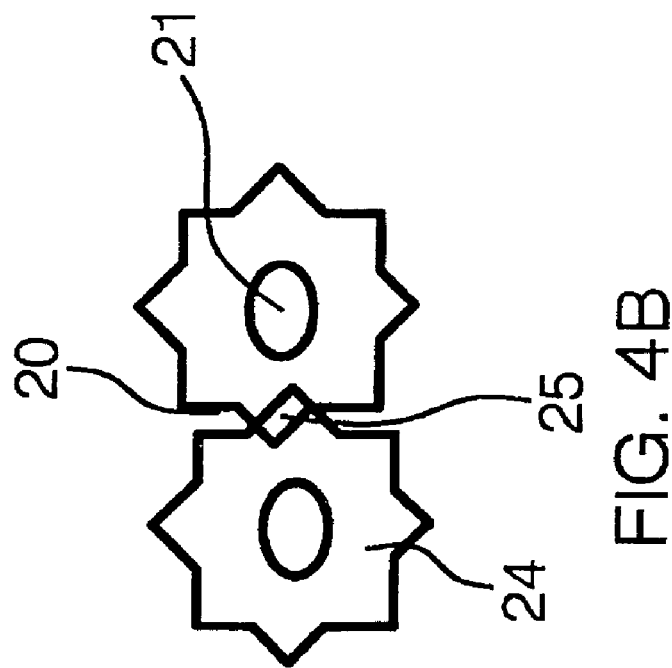
FIG. 4B illustrates a partially coated, agglomerated particle which can be used according to an aspect of the present invention; and, FIG. 5 illustrates a package design employing an isolated dough or batter mix composition wherein the sodium bicarbonate or other suitable leavening base component is dispersed directly within droplets of oil which are dispersed directly within the acidulated batter composition and wherein the leavening component may be in the form of either raw particles, partially coated particles or encapsulated particles according to an aspect of the present invention.
Figure 4A:
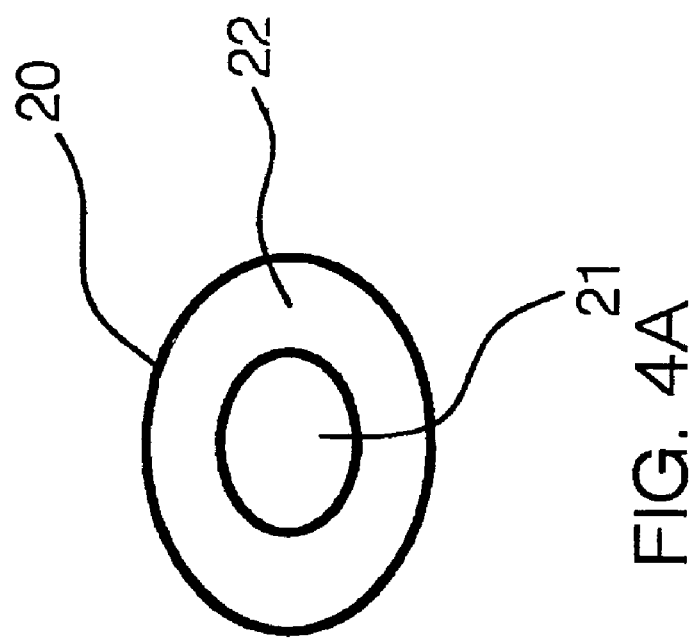
FIG. 4A illustrates a fully encapsulated particle which can be used according to an aspect of the present invention.

Referring now to FIGS. 4A and 4B, there are shown basic designs for encapsulated sodium bicarbonate (FIG. 4A) and partially coated sodium bicarbonate (FIG. 4B). In FIG. 4A, an encapsulated sodium bicarbonate particle 20 includes a basic leavening agent at a core 21 of the microcapsule, surrounded by a discrete and substantially complete layer or shell 22. The encapsulated product 20 is typically a stand-alone product. In FIG. 4B, the partially coated sodium bicarbonate takes the form of an agglomeration of particles 21 connected to each other by a coating material 24. The partially coated product 20 is typically an agglomeration of particles 21, whereupon a weak interface 25 may exist between the particles connected together. In some instances, the particles 21 may be fully coated or there may be gaps in the coating. In addition, sometimes the agglomeration breaks at the interface 25, leaving at least partially exposed particles 21.

The encapsulated particles depicted in FIG. 4A can be generally made using fat, wax, or coating materials composed of hydrogenated vegetable oils, and employing such encapsulation techniques as fluid bed processors, wurster columns, spray dryers, cooling towers, spray and chill chambers, spray extrusions methods, spinning extrusions systems, or any of the pressure encapsulation techniques described in or evolved from U.S. Pat. No. 4,978,483, issued Dec. 18, 1990, entitled APPARATUS AND METHOD FOR MAKING MICROCAPSULES, or U.S. Pat. No. 5,271,881, issued Dec. 21, 1993, entitled APPARATUS AND METHOD FOR MAKING MICROCAPSULES, or U.S. Pat. No. 5,460,756, issued Oct. 24, 1995, entitled METHOD FOR ENTRAPMENT OF LIQUIDS IN TRANSFORMED WAXES, all by Redding, or any other appropriate encapsulation technique. The entire disclosure of these patents, U.S. Pat. No. 4,978,483, issued Dec. 18, 1990, entitled APPARATUS AND METHOD FOR MAKING MICROCAPSULES, or U.S. Pat. No. 5,271,881, issued Dec. 21, 1993, entitled APPARATUS AND METHOD FOR MAKING MICROCAPSULES, or U.S. Pat. No. 5,460,756, issued Oct. 24, 1995, entitled METHOD FOR ENTRAPMENT OF LIQUIDS IN TRANSFORMED WAXES, are hereby incorporated by reference herein.

The coated particles depicted in FIG. 4B are generally made using fat, wax, or coating materials composed of hydrogenated vegetable oils, and employing such granulation methods as high shear or low shear mixing devices such as Hobart mixers, Sigma mixers, Colette mixers or other agitation based methods, whereupon a melted coating materials is added to powdered sodium bicarbonate and generally agitated while slowly cooling the fat until it re-solidifies into a hard or malleable coating over the core particle. Generally the coated particle is not a single particle after such manufacturing methods, leading to the collection of agglomerated particles as depicted in FIG. 4B.

Referring still to FIGS. 4A and 4B, the leavening agent itself is typically in the form of a powder substance 21, sodium bicarbonate, for example. The core leavening agent 21 is formed into small pellets 20, coated in a water proof but meltable or heat-dispersible coating substance which forms an encapsulate shell 22 or coating surface 24. The coating material 22, 24 prevents reaction of leavening material 21 with the ingredients of the batter 2 until the material 22, 24 is melted or dispersed, upon the cooking of the batter, so that the leavening agent 21 is then released into the batter 2.

The coating 22, 24, preferably, is comprised of a fat, which is chosen for its melting point and release timing in the desired baked good. In a pancake batter, for example, heat tends to rise quickly during the cooking process due to its low mass. Typically the coating materials 22, 24 may be designed to release within the first 60 seconds of the frying process. In other baked goods, such as breads for example, the release timing ratio may correspond to the internal temperature developed within the product in relation to its oven time. In loaf bread, a release temperature of 135° F. may be used at about 15 minutes into the baking process. For muffins the release may be required in the first 5 minutes of baking, when the internal temperature of the product reaches 115° F.–120° F. As will be readily understood by those possessing an ordinary level of skill in the pertinent art after considering the invention herein, the choice of the coating material will vary depending upon the specifics of the temperature rise of the selected bake product. The application of heat during cooking acts as the release mechanism, releasing the leavening agent for leavening the batter to produce a cooked leavened product. The timing of that release may be dependent upon the specific cooking conditions of the targeted bake good.

The coating 22, 24 may also be chosen for its ability to provide adequate buoyancy to the microspheres 3 or coated product above the layer 4 as depicted in FIG. 1.

Figure 2:
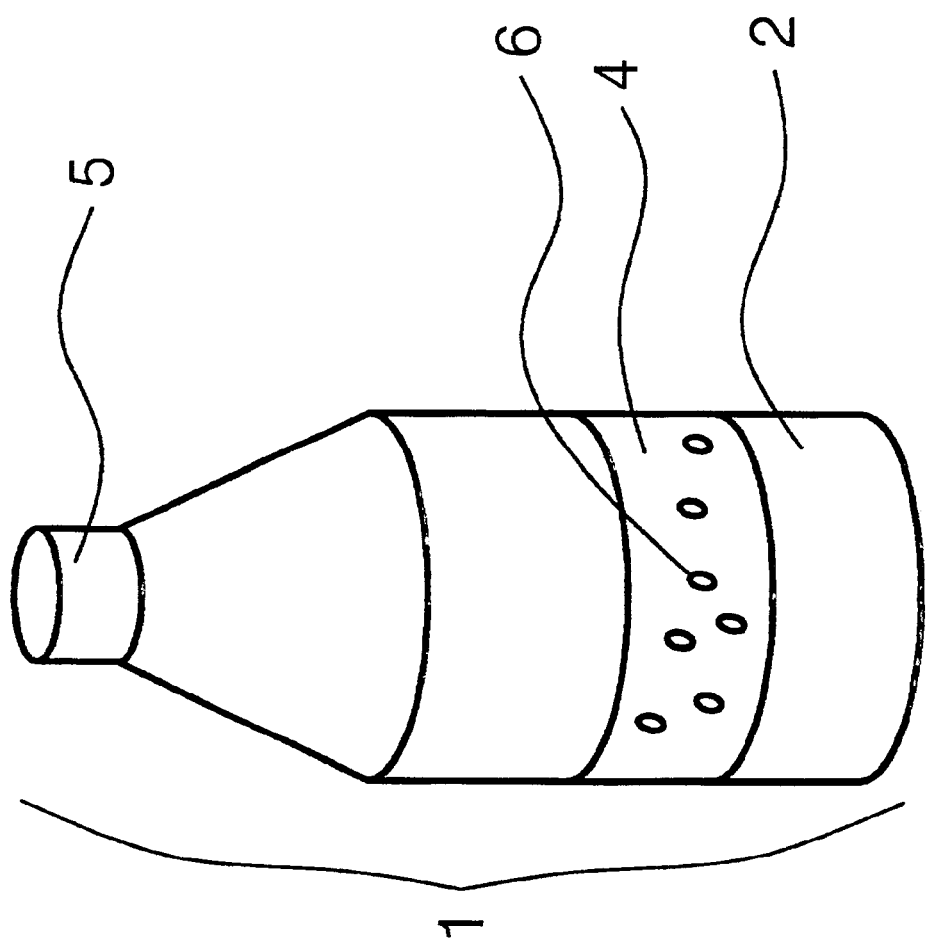
FIG. 2 illustrates a package design employing the isolated dough or batter mix composition wherein a sodium bicarbonate or other suitable leavening base component is dispersed directly within the oil isolation layer according to an aspect of the present invention.

Alternatively, the microspheres may be immersed within the layer 4 as depicted in FIG. 2. Referring now also to FIG. 2, there is shown a package design employing an isolated dough or batter mix composition 2, wherein the sodium bicarbonate leavening base component 6 is dispersed directly within the oil isolation layer 4, in the form of either raw particles, partially coated particles or encapsulated particles, according to an aspect of the present invention.

Whether placed above the oil layer 4, or immersed within the oil layer 4, according to an aspect of the present invention, the sodium bicarbonate leavening agent remains isolated from the acidulated batter until cooked. Referring still to FIG. 2, the dispersed sodium bicarbonate may be in the form of an encapsulated product, a coated product or in raw particulate micronized to such a size whereupon the micro-particle possesses such a specific gravity so as to enable the microparticles to remain suspended and contained within the oil layer 4.

By isolating the leavening agent from the remainder of the batter, the pH of the batter can be lowered by the addition of edible acids in accordance with an aspect of the present invention, to inhibit bacterial growth, for preservation of the batter. Additionally, fungistatic agents to inhibit mold may also be added to the batter and, in the acidic environment, may operate more effectively and in smaller quantities.

Referring again to FIGS. 1 and 2, according to an aspect of the present invention the batter composition exits the container 1 through an opening 5, such as a nozzle at the top of the container 1. According to an aspect of the present invention, the container 1 may take the form of an easy open can, bottle or jar, or other suitable container. The nozzle 5 serves to agitate and admix the batter 2, oil 4 and sodium bicarbonate 3, 6 ingredients as they exit the container 1 and flow into a frying pan, or other bake mold or container, for example. In the case of pancake batter, the flow would be to a frying pan or waffle iron, for example. For cupcakes and muffins, the flow may be to molded baking pans, for example. Such cooking pans may be pre-heated using a grill, stove or oven, which could include a microwave or convection oven unit, for example. Upon deposition onto the cooking surface, the oil forming the oil layer 4 serves as a lubricant and liberates the trapped sodium bicarbonate 3, 6. If the sodium bicarbonate 3, 6 is in an encapsulated form, the fat coating dissolves using heat as the release mechanism. If the sodium bicarbonate 3, 6 is dispersed in raw particulate form within the oil layer 4, as depicted in FIG. 2, it separates during cooking to mix with the acidulated batter 2 or dough 2, effecting the leavening action at that point.

Figure 3:
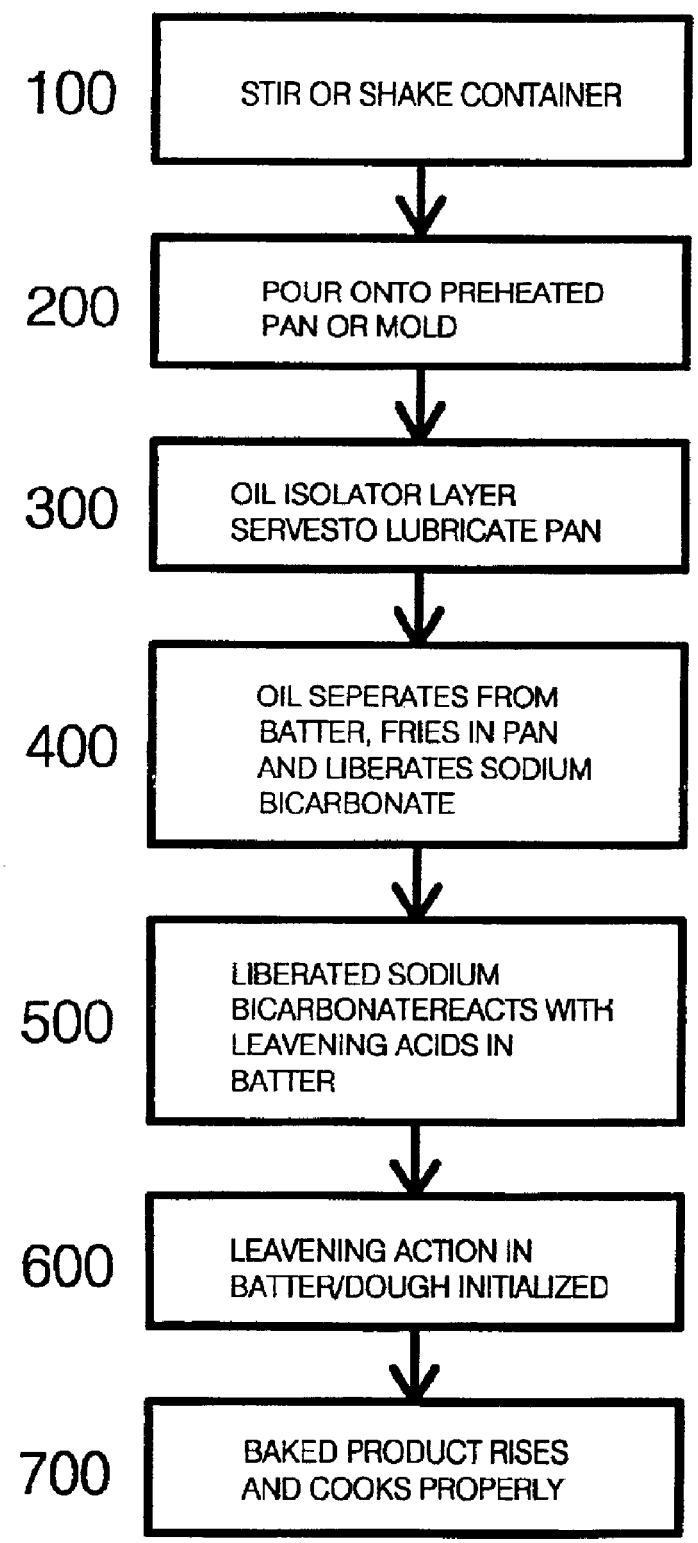
FIG. 3 illustrates a block diagram of a process of preparing a chemically leavened bakery product, such as that illustrated in FIG. 1, and representing the subsequent cooking of the batter to a finished culinary product according to an aspect of the present invention.

Referring now to FIG. 3, there are shown steps involved in applying the invention to a bake application, according to an aspect of the present invention. First, the container 1 is shaken, or otherwise agitated 100 to allow the mixing of the oil of the oil layer 4 and sodium bicarbonate microspheres 3, 6. Then, the container 1 may be opened and the contents poured 200 onto a pre-heated pan or mold. Heat from the pan tends to fry the cooking oil, which was originally used as the isolator oil for layer 4 within the container 1. The warmed oil lubricates the heating surface 300, and as the temperature rises the basic leavening agent is liberated from the oil 400. If the oil contains encapsulated sodium bicarbonate, as depicted in FIG. 4A, which has been dispersed within the oil as shown in FIG. 2, the capsules tend to free themselves and disperse within the batter. If the oil contains raw sodium bicarbonate as also depicted in FIG. 2, the particles are again freed from the oil during the application of heat and disperse within the batter. If the product contains the configuration illustrated in FIG. 1, whereupon the encapsulated sodium bicarbonate was resting above the oil layer 4, the shaking or agitation 100 of the container 1 tends to give a proper distribution of the capsules within the batter, and again heat tends to melt or dissolve the coating or shell layer, enabling the sodium bicarbonate to intermingle with the batter. At step-500, the liberated basic leavening agent, such as sodium bicarbonate, reacts with the acidified batter and the leavening action commences at Step-600. According to an aspect of the present invention, at this step, the particle size of the leavening base may be below about 60 mesh, or lower than about 250 microns, although other particle sizes may be possible. It is believed that particles larger than that limit may tend to form brown spots in certain baked products, such as muffins and pancakes for example. The final baked good rises and browns normally in Step-700.

According to any aspect of the invention, the first step in preparing the batter is mixing the standard ingredients of the batter, less the leavening agent, in a conventional process. These ingredients may include flour, eggs, sugar, milk solids, and water, for example. After the initial composition of the batter has been mixed, a fungistatic agent may be added to the batter. An acidulant agent added to the liquid batter may serve also as the fungistatic agent. It is believed that fungistatic agents imparting a pH below about 5.5 to the liquid batter mix generally yield satisfactory results. The fungistatic agent inhibits mold growth in the premixed batter. This fungistatic agent may be taken from a group of standard chemical additives, which may include any GRAS approved fungistatic agents, but preferably those having acceptable taste, such as sorbic acid and acetic acid, for example. Sorbic acid and/or acetic acid, Sodium Acid Pyrophosphate (SAPP), GDL and SALP are all possible dual function acids, providing both fungistatic and leavening functionality. These acids present the desirable properties of minimum change in the taste of the product and also exhibit enhanced effectiveness at lower pH levels.

The pH of the batter after addition of the acid is generally below the level of about 5 for general batter of this type to inhibit bacterial growth. Since inhibitions of bacterial growth depend upon the type of bacteria and temperature of storage, this pH level may vary. However, below a pH level of about 5, e.g. 4.7 or lower, has been found effective to retard bacteria growth for refrigerable products. If however, room or ambient shelf-stable batters are desired, the pH is preferably below the level of approximately 4, or about 1 below the suitable level for refrigeratable batters. The pH of the batter may be determined at about 24 hours after the mixture is made. The amount of acid added may be sufficient to compensate for any initial neutralizing reaction, which might take place upon mixing of the batter ingredients.

After the addition of the acid, it may be desirable, although not always, to homogenize the batter. An homogenization step is more often preferable for preparation of refrigerated products in that it tends to improve the flow of the batter at refrigerator temperatures.

At this step, according to an aspect of the present invention, a storage stable batter composition having reduced pH to retard bacteria growth and including a fungistatic agent for retardation of mold growth and the like is provided. The batter is suitable for use in preparation of food products upon the subsequent addition of an alkaline leavening producing agent which, when added, raises the pH to a level of greater than around 5, or roughly 6 or 7, which presents a more acceptable taste for bakery products, such as pancakes and the like, for example.

As set forth, the leavening agent may be suspended either above (FIG. 1) or within in the oil isolator layer (FIG. 2) and chemically isolated from the acidulated batter mixture. According to an aspect of the present invention, this may be achieved by first forming microspheres of the leavening agent. This may be done in several ways, which are conventional in the pharmaceutical or microencapsulation art. One method is by mixing the leavening agent, as for example powdered sodium bicarbonate or baking soda, with a low melting point fat such as Shurset 117 or bakers 117 as supplied by A.C. Humko Inc., which is sized below about 60 mesh in particle size. The heat is taken to 20° F. above the melting point of the fat in a mixing bowl for example, and then stirred for several minutes. Next the heat is removed and the fat allowed to cool until it solidifies as a coating or encapsulant onto the surface of the sodium bicarbonate layer. With a melt point of 117° F.–120° F., these coated sodium bicarbonate particles are suitable for use in pancake, and other low mass baked goods such as muffins and snack bread products, for example. For use in loaf breads or other high mass baked goods, a melting point of 135° F. may be desired and such materials as a combination of fats, such as a blend of soy or cottonseed based hydrogenated vegetable oil, may be employed. Common examples include C-Flakes and S-Flakes as supplied by A.C. Humko Inc.

The product of this invention, depending upon the pH and amount of any additional use of a fungistatic agent employed, may be suitable for storage at various temperatures. Normally, a refrigeratable product may be preferred which is storable at a temperature range of around 35° F.–40° F. When additional preservatives are added to allow adequate preservation at higher temperatures, a shelf-stable batter results which may be stored at room temperature. It should be noted that the product of this invention also may be suitable for freezing or refrigeration. It is believed that a mixture according to the present invention, particularly one incorporating preserving acids, gives the additional advantage of providing a product which is better conditioned for refrigerator and freezer storage in that the acidification of the batter retards the thickening or glutenization of the batter.

After the product has been stored either in a retail establishment and/or on a consumer's shelf, for example, the product may be cooked to form pancakes or whatever other food or bakery product is intended.

The cooking of the batter composition can be achieved by merely pouring the batter directly into a greased skillet, for example, and where upon contact with the high temperatures the leavening agent is released into the batter as the coating substance and bonding agent melt or disperse, thus reacting with the acid of the batter and raising the pH to a more suitable and desirable level and while leavening the product by the formation of carbon dioxide bubbles. The oil layer, at this point, acts as a lubricant for the pan surface and assists in the browning of the baked good.

Other additives may also be desirable, using known techniques, to overcome other problems, which may be encountered. Particularly, stabilizers may be added to prevent separation of the batter, and the addition of antioxidants, such as absorbic acid, buylated hydroxy anisole, or buylated hydroxy toluene, may be desirable.

According to an aspect of the present invention, a resulting batter may comprise from about 30 wt-% to about 60 wt-% flour; from about 20 wt-% to about 40 wt-% water; from about 0.1 wt-% to about 2.0 wt-% leavening acid; from about 0.1 wt-% to about 2.0 wt-% leavening base (in a coated form the wt-% is based upon the weight of the active component within the coated or encapsulated leavening base product) and about 0.1 to about 1% cooking oil, which serves as the isolator oil layer and the lubricating oil.

A non-limiting and merely exemplary batter or dough prepared according an aspect of the present invention may have the ingredients listed in Table 1 in the following amounts:

TABLE 1

| DOUGH OR BATTER INGREDIENT | (WT-%) APPROXIMATE ACCEPTABLE RANGE | (WT-%) APPROXIMATE PREFERABLE RANGE |
|---|---|---|
| Flour | 30–60 | 35–55 |
| Water | 20–40 | 25–35 |
| Acid Leavener | 0.1–2.0 | 1.0–1.5 |
| Base Leavener | 0.1–2.0 | 0.75–1.5 |
| Cooking Oil (Isolator Layer) | 0.1–3.0 | 0.1–3.0 |

Without limiting the foregoing, major components of the batter, the acidic leavening agent and the base leavening agent are described in greater detail and for sake of clarity only.

Regarding the flour, the dough or batter of the invention contains a grain constituent that contributes to the structure of the dough. Different grain constituents lend different texture, taste and appearance to a baked good. Flour is a grain constituent that is frequently used in baked goods. Suitable flours include hard wheat flour, soft wheat flour, corn flour, high amylose flour, low amylose flour, and the like, to name just a few. For example, a dough product made with hard wheat flour will generally have a more coarse texture than dough made with soft wheat flour, due to the presence of a higher amount of gluten in hard wheat flour.

Regarding the leavening agents, according to an aspect of the present invention, the doughs and batters include chemical leavening agents that increase the volume and alter the texture of the final baked good. Chemical leavening typically involves the interaction of a leavening acid and sodium bicarbonate for example, a leavening base. The leavening acid triggers the release of carbon dioxide from the bicarbonate upon contact with moisture. The carbon dioxide gas aerates the dough or batter during mixing and baking to provide a light, porous cell structure, fine grain, and a texture with desirable appearance and palatability. As is well known, the evolution of carbon dioxide essentially follows the stoichiometry of typical acid-base reaction. The amount of bicarbonate present determines the amount of carbon dioxide evolved, whereas the type of leavening acid affects the speed at which the carbon dioxide is liberated. The amount of leavening base used in combination with the leavening acid may be balanced such that a minimum of unchanged reactants remain in the finished product. An excess amount of leavening base can impart a bitter flavor to the final product for example, while an excess of leavening acid can make the baked product tart.

Sodium bicarbonate, or baking soda, is a leavening base that can be used as the primary source of carbon dioxide gas in many chemical leavening systems. This compound is stable and relatively inexpensive to produce. Other leavening bases include potassium bicarbonate, ammonium carbonate, and ammonium bicarbonate, for example.

Leavening acids include sodium or calcium salts of ortho, pyro, and complex phosphoric acids in which at least two active hydrogen ions are attached to the molecule, for example. Baking acids generally include monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-delta-lactone (GDL), potassium hydrogen tartrate (cream of tartar) and the like, for example.

If the complementary leavening agent is added to the batter in an encapsulated form, the encapsulation material may be selected such that it can withstand shear forces and temperature increases during formation of the batter, but ultimately dissolves and releases the leavening agent when the batter is used to form a dough or batter as set forth. Suitable materials that can be used to encapsulate the leavening agent include fats, oils and waxes, for example. Encapsulated baking soda is one example of an encapsulated leavening agent suitable for use in the invention.

In addition to the chemical leavenings described above, the dough of the invention may also contain other leavening agents such as yeast, for example.

Regarding additional ingredients, dough or batter according to the invention may contain agents that modify the texture and other qualities of the dough or the finished product. Texture modifying agents can improve viscoelastic properties, plasticity, dough development, and the like. Examples of textural agents include fats, emulsifiers, hydrocolloids, and the like.

Fat is frequently added to a dough formulation as a shortening that entraps air during the creaming process. Consequently, shortening helps improve the volume, grain and texture of the final product. Shortening also has a tenderizing effect and improves overall palatability and flavor of a baked good. Either natural shortenings, animal or vegetable, or synthetic shortenings can be used, for example.

Generally, shortening is comprised of triglycerides, fats and fatty oils made predominantly of triesters of glycerol with fatty acids. Fats and fatty oils useful in producing shortening include cotton seed oil, ground nut oil, soybean oil, sunflower oil, sesame oil, olive oil, corn oil, safflower oil, palm oil, palm kernel oil, coconut oil, and combinations thereof, for example.

Emulsifiers are nonionic, anionic, and/or cationic surfactants that influence the texture and homogeneity of the dough mixture, increase dough stability and improve the eating quality of the finished product. Emulsifiers include lecithin, mono- and diglycerides of fatty acids, propylene glycol mono- and diesters of fatty acids, glyceryl-lacto esters of fatty acids, ethoxylated mono- and diglycerides, and the like, to name a few.

Hydrocolloids are added to the dough formulation to increase moisture content, and to improve viscoelastic properties of the dough and crumb texture of the final product by stabilizing small air cells within the batter and by binding to moisture. Hydrocolloids include xanthan gum, guar gum, locust bean gum, and the like.

Dough-developing agents can also be added to the dough formulation to enhance the dough viscosity, texture and plasticity. Any number of dough-developing agents known to those of skill in the art may be used including azodicarbonamide, diacetyl tartaric acid ester of mono- and diglycerides (D.A.T.E.M), and potassium sorbate, for example.

The doughs of the invention may also contain nutritional supplements such as vitamins, minerals, proteins, and the like. Examples of nutritional supplements which may be used include thiamin, riboflavin, niacin, iron, calcium, and mixtures thereof, for example.

Flavorings such as sweeteners, spices and specific flavorings such as bread flavoring may also be used with the dough of the invention. Sweeteners include regular and high fructose corn syrup, sucrose (cane or beet sugar), dextrose, and the like. In addition to flavoring the baked good, sweeteners such as sugar may increase the moisture retention of a baked good, thereby increasing its tenderness.

Doughs can also include preservatives and mold inhibitors such as sodium salts of propionic or sorbic acids, sodium diacetate, vinegar, monocalcium phosphate, lactic acid and mixtures thereof.

Figure 5:
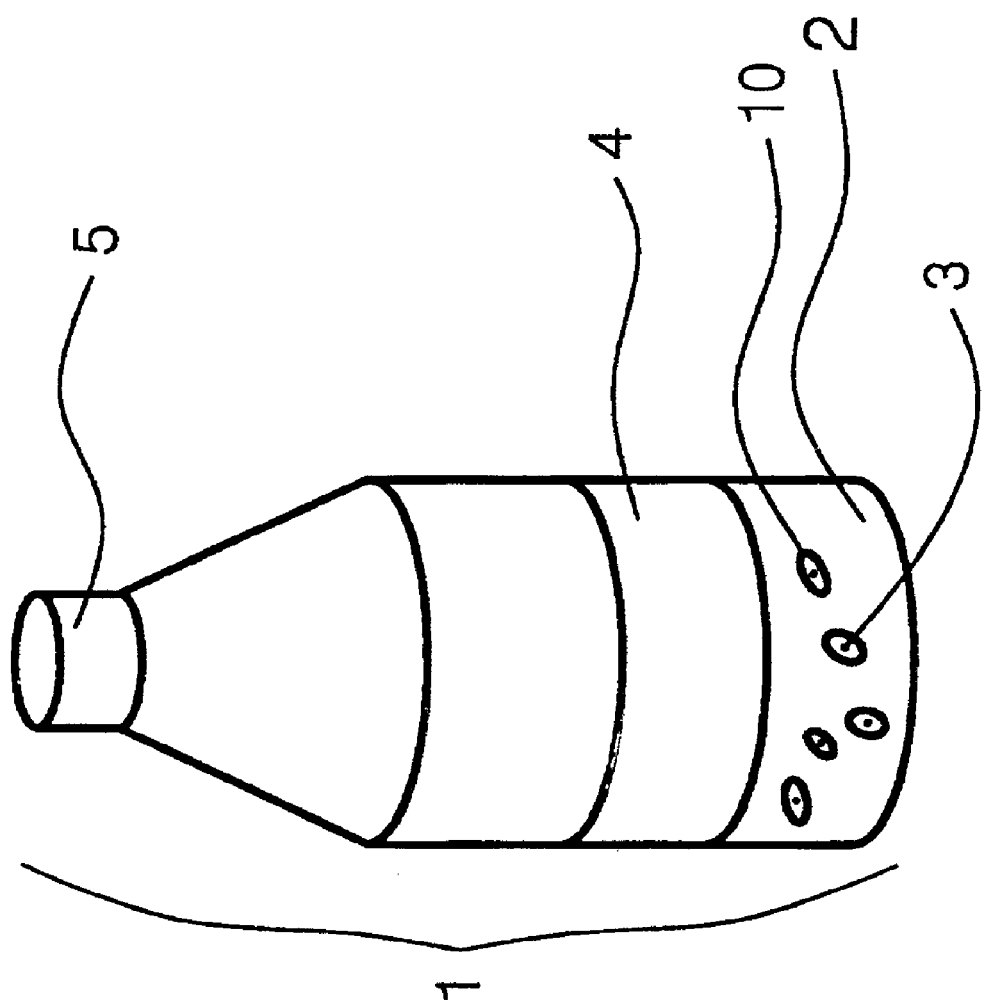

According to an aspect of the present invention, and referring now to FIG. 5, a container 1 contains an acidulated batter 2 with an oil layer 4 placed above the batter 2 and before the container opening 5. Within the batter 2, oil-coated dispersed particulates of an alkali-leavening agent, such as sodium bicarbonate, 3 are suspended. The particulates 3 may be raw, encapsulated or partially coated sodium bicarbonate. The oil-coated particulates 3 are caused to stay suspended within the batter by means of surfactants added to the either the batter 2 or to the oil droplet 10, and through the adjustment of the particulate 3 specific gravity relative to the batter composition 2, for example. The oil droplet 10 may be the same oil material used as the isolator layer 4, or it may be a different oil material, for example. The oil droplet 10 further protects the sodium bicarbonate from the acid environment of the surrounding acidulated batter 2 during storage. According to an aspect of the present invention, the sodium bicarbonate is encapsulated, and the oil droplet 10 provides a second layer of protection from premature reaction with the acidulated batter 2 during storage.

That is, according to the design illustrated in FIG. 5, there is provided extended storage life by further isolation of the alkali leavening agent 3 from the acidified batter 2, until heat is applied and the oil droplet 10 disperses, allowing the sodium bicarbonate to be released. Further or upon the application of heat, the capsule surrounding the sodium bicarbonate particle 3 may melt away and effect release.

The use of a thin oil layer 4 above the batter composition provides a further air barrier to the batter 2 and also extends shelf stability by providing a microbial barrier to air leaks, which may occur in the packaging 1.

Particular embodiments of the present invention will be further discussed with regard to the following non-limiting and merely representative examples.

A series of encapsulated products may be made using hydrogenated vegetable oil coatings, employing a modified fluid bed coating system. Table 2 shows the formulation for each encapsulated product. As set forth, a fluid bed system may be used to effect incomplete encapsulation and produce partially coated particles shown in FIG. 4B.

TABLE 2

| Specification | Sample: OST-9361-01 | Sample: OST-9362-02 | Sample: OST-9351-01 | Sample: OST-9351-02 | Sample: OST-9361-02 | Sample: OST-0010-01 | Sample: OST-0011-01 |
|---|---|---|---|---|---|---|---|
| Active Material | Sodium Bicarbonate | Sodium Bicarbonate | Sodium Bicarbonate | Sodium Bicarbonate | Sodium Bicarbonate | SAPP-23 | SAPP-23 |

TABLE 2-continued

| Specific ation | Sample: OST-9361-01 | Sample: OST-9362-02 | Sample: OST-9351-01 | Sample: OST-9351-02 | Sample: OST-9361-02 | Sample: OST-0010-01 | Sample: OST-0011-01 |
|---|---|---|---|---|---|---|---|
| Core Content | 70% | 40% | 70% | 40% | 40% | 70% | 70% |
| Shell Material | Shurset-117 | Shurset-117 | Alkolizer-C | Alkolizer-C | Shurset-117/ Alkolizer-C | Shurset-117 | Alkolizer-C |
| Shell Content | 30% | 60% | 30% | 60% | 60% | 30% | 30% |
| Inner Shell Material | None | None | None | None | Shurset-117 | None | None |
| Inner Shell Content | None | None | None | None | 30% | None | None |
| Core particle Size | 177–297 microns | 177–297 microns | 177–297 microns | 177–297 microns | 177–297 microns | 177–297 microns | 177–297 microns |
| Final Product Part.Size | 100%< 250 microns | 100%< 250 microns | 100%< 250 microns | 100%< 250 microns | 100%< 250 microns | 100%< 250 microns | 100%< 250 microns |
| Melt Point | 117(f) | 117(f) | 135(f) | 135(f) | 120(f) | 117(f) | 135(f) |

CONTROL SAMPLE BATTER USING NO SODIUM BICARBONATE
A batter was developed according to the following recipe:

| INGREDIENT | MIX RATIO BY WT-% |
|---|---|
| Flour (Gold Medal General Purpose Bleached Flour) | 35% |
| Sugar | 1.9% |
| Non-fat Dry Milk | 3.3% |
| Liquid vegetable oil | 3.0% |
| Water | 44.5% |
| Stabilized egg powder | 11.7% |
| SAPP-23 in Raw form (FMC Corp.) | 0.6% |
| Encapsulated Sodium Bicarbonate Model No: | 0% |
| Lactic Acid | 0% |
| Polyoxethylene Sorbitan Monooleate | 0.2 cc |

The ingredients were added together and stirred using a Hobart Mixer until a flowable batter was produced after 30 minutes of agitation. Twelve samples were taken and tested at one-week intervals. Six samples were refrigerated in a conventional household refrigerator in the refrigeration section while six samples were sealed in a plastic jar and placed on a shelf in the laboratory. The batter's pH level was tested after 24 hours and that value was compared to the pH level over time. In each case the pH level was found to remain stable at or below the planned pH level of 5.5. No sodium bicarbonate was added to the batter. This established a control on the acidic batter formulation.

| SAMPLE | PH after 24 hrs. Refrigerated | PH after 12 weeks Refrigerated | PH after 12 weeks Room temp. |
|---|---|---|---|
| 1. | 5.7 | 4.3 | 3.9 |
| 2. | 3.9 | 4.0 | 3.9 |
| 3. | 4.3 | 4.2 | 3.6 |
| 4. | 4.2 | 4.3 | 3.7 |
| 5. | 4.5 | 4.5 | 3.7 |
| 6. | 4.7 | 4.6 | 3.7 |

SAMPLE BATTER USING ENCAPSULATED SODIUM BICARBONATE ADDED DIRECTLY TO THE BATTER MIX
A batter was developed according to the following recipe:

| INGREDIENT | MIX RATIO BY WT-% |
|---|---|
| Flour (Gold Medal General Purpose Bleached Flour) | 35% |
| Sugar | 1.9% |
| Non-fat Dry Milk | 3.3% |
| Liquid vegtable oil | 3.0% |
| Water | 44.5% |
| Stabilized egg powder | 11.7% |
| SAPP-23 in Raw form (FMC Corp.) | 0.6% |
| Encapsulated Sodium Bicarbonate Model No: OST-9362-02 | 1.4% |
| Lactic Acid | 0% |
| Polyoxethylene Sorbitan Monooleate | 0.2 cc |

Twelve samples were taken and tested at one-week intervals. Six samples were refrigerated in a conventional household refrigerator in the refrigeration section while six samples were sealed in a plastic jar and placed on a shelf in the laboratory. The batter's pH level was tested after 24 hours and that value was compared to the pH level over time. In each case the pH level was found to vary significantly from the planned pH level of 5.5.

| SAMPLE | PH after 24 hrs. Refrigerated | PH after 12 weeks Refrigerated | PH after 12 weeks Room temp. |
|---|---|---|---|
| 7. | 5.7 | 6.3 | 6.8 |
| 8. | 5.5 | 6.5 | 6.8 |
| 9. | 5.5 | 6.3 | 6.8 |
| 10. | 5.3 | 6.2 | 6.8 |
| 11. | 5.6 | 6.5 | 6.8 |
| 12. | 5.5 | 6.5 | 6.8 |

The results indicate that the microencapsulated sodium bicarbonate produced a batter that was not stable when the microcapsules are added directly to the acidulant batter. It is believed that the acidulant dissolved or ruptured the shell of the microcapsules, allowing the reaction to take place. As the pH was observed to rise, indicating neutralization of the acidulant, mold was observed to form, and the containers swelled as carbon dioxide gas formed in each container. Sample OST-9362-02 was chosen because it held the lowest concentration of active sodium bicarbonate, and therefore the thickest shell layer at 60%. The thicker shell did not protect against reaction when totally immersed in the acidulated batter.

The results were reproduced using Sample OST-9361-02, which employs a double capsule shell. In this sample a lower melting shell material was employed in the inner coating and a higher melting material was applied as the outer coating. The result was similar to the above example in that the capsules, when immersed in the acidified batter also tended to fail over time, releasing the active sodium bicarbonate in storage rather than upon cooking.

SAMPLE BATTER USING ENCAPSULATED SODIUM BICARBONATE PLACED ABOVE OIL ISOLATOR LAYER IN CONTAINER
A batter was developed according to the following recipe:

| INGREDIENT | MIX RATIO BY WT-% |
|---|---|
| Flour (Gold Medal General Purpose Bleached Flour) | 34.8% |
| Sugar | 1.9% |
| Non-fat Dry Milk | 3.3% |
| Liquid vegetable oil | 3.0% |
| Water | 44.1% |
| Stabilized egg powder | 11.6% |
| SAPP-23 in Raw form (FMC Corp.) | 0.6% |
| Encapsulated Sodium Bicarbonate Model No: OST-9361-01 | 0.8% |
| Lactic Acid | 0% |
| Polyoxethylene Sorbitan Monooleate | 0.2 cc |

The following procedure was used to prepare the batter. The flour, sugar (dextrose), and dry milk powder were gently mixed. The stabilized egg yolk powder, SAPP-23, Polyoxethylene Sorbitan Monooleate and water were gently mixed and stirred to form homogenous blend. These two mixtures were mixed for 2 minutes at low speed in a Hobart mixer. A liquid, pourable batter results. The liquid, pourable batter was added to a container. Liquid vegetable oil was then added over the liquid batter.

Dry powder encapsulated sodium bicarbonate was added over the liquid vegetable oil. The encapsulated product was observed to float above the oil, and was effectively isolated and kept apart from the acidulated batter.

The container was then sealed, with one being stored in refrigeration and the other at room temperature.

Twelve samples were taken and tested at one-week intervals. Six samples were refrigerated in a conventional household refrigerator in the refrigeration section while six samples were sealed in a plastic jar and placed on a shelf in the laboratory. The batter's pH level was tested after 24 hours and that value was compared to the pH level over time. In each case the pH level was found to remain stable close to the planned pH level of 5.5.

| SAMPLE | pH after 24 hrs. Refrigerated | pH after 12 weeks Refrigerated | pH after 12 weeks Room temp. |
|---|---|---|---|
| 13. | 5.7 | 5.9 | 5.9 |
| 14. | 5.5 | 5.5 | 5.5 |
| 15. | 5.5 | 5.8 | 6.1 |
| 16. | 5.3 | 5.3 | 5.3 |
| 17. | 5.6 | 5.6 | 5.6 |
| 18. | 5.5 | 5.7 | 5.9 |

A food product was prepared using the resulting batter according to the following procedure.

The container containing the ready to use pancake batter prepared in accordance with this invention was agitated, e.g., shaken vigorously. The ready to use batter was then placed in a griddle or skillet, preheated to 200° F. and cooked for 2 minutes on one side, or until the surface leavens and browns. The pancakes were then turned to the other side and cooked for approximately 1–2 minutes more, or until the underside was golden brown. The pancakes were then moved to warmed service plates.

Pancakes made from this experiment were comparable and indistinguishable from freshly made pancakes made from the control formulation in size, mass, browning, texture, and taste.

The results appear to indicate that the microencapsulated sodium bicarbonate kept isolated and above the acidified batter produced a liquid batter that was very stable and mold resistant over the period of 12 weeks in both refrigerated and room temperature storage conditions. As will be readily understood by those possessing an ordinary skill in the pertinent arts after considering the invention disclosed herein, any changes apparent in the pH levels are well within the range expected of a stored batter. As will also be readily understood, adjustments in the acidulant level can be made to provide greater fungicidal protection The OST-9361-01 sample of encapsulated sodium bicarbonate was chosen because it provided a low release melting temperature for the microcapsule shell at about 117° F. and possessed a high active loading (70%).

Another experiment was conducted using encapsulated sodium bicarbonate sample no. OST-9362-02 (active loading 40% and melting point of 117 F. having very similar results.

SAMPLE BATTER USING ENCAPSULATED SODIUM BICARBONATE PLACED WITHIN OIL ISOLATOR LAYER IN CONTAINER
A batter was developed according to the following recipe:

| INGREDIENT | MIX RATIO BY WT-% |
|---|---|
| Flour (Gold Medal General Purpose Bleached Flour) | 34.8% |
| Sugar | 1.9% |
| Non-fat Dry Milk | 3.3% |
| Liquid vegetable oil | 3.0% |
| Water | 44.1% |
| Stabilized egg powder | 11.6% |
| SAPP-23 in Raw form (FMC Corp.) | 0.6% |
| Encapsulated Sodium Bicarbonate Model No: OST-9361-01 | 0.8% |
| Lactic Acid | 0% |
| Polyoxethylene Sorbitan Monooleate | 0.2 cc |

The flour, sugar (dextrose), and dry milk powder were gently mixed. The stabilized egg yolk powder, Sodium Acid Pyrophosphate-23 (SAPP-23), polyoxethylene sorbitan monooleate and water were mixed and gently stirred to form a homogenous blend. The two resultants were combined and mixed for 2 minutes at low speed in a Hobart mixer. A liquid, pourable batter results.

Dry powder encapsulated sodium bicarbonate was added to the liquid vegetable oil and stirred until dispersed in a homogeneous fashion. Encapsulated particles were observed to be suspended in the oil mix.

The batter was added to a container and the liquid vegetable oil/encapsulated sodium bicarbonate mixture was added over the liquid batter. The container was sealed with one sample being stored in refrigeration and another at room temperature.

Twelve Samples were taken and tested at one-week intervals. Six samples were refrigerated in a conventional household refrigerator, while six samples were sealed in a plastic jar and placed on a shelf in the laboratory. The batter's pH level was tested after 24 hours and that value was compared to the pH level over time. In each case the pH level was found to remain stable close to the planned pH level of 5.5.

| SAMPLE | pH after 24 hrs. Refrigerated | pH after 12 weeks Refrigerated | pH after 12 weeks Room temp. |
|---|---|---|---|
| 19. | 5.7 | 5.8 | 5.9 |
| 20. | 5.5 | 5.5 | 5.5 |
| 21. | 5.5 | 5.8 | 6.1 |
| 22. | 5.3 | 5.3 | 5.3 |
| 23. | 5.6 | 5.7 | 5.9 |
| 24. | 5.5 | 5.7 | 5.9 |

The resultant composition was prepared for consumption according to the following procedure.

The container containing the ready to use pancake batter prepared in accordance with this invention was agitated, e.g. vigorously shaken. The ready to use batter was placed in a griddle or skillet, preheated to 200° F. and cooked for 2 minutes on one side, or until the surface leavens and browns. The pancakes were then turned to the other side and cooked for approximately 1–2 minutes more, or until the underside is golden brown. The pancakes were then transferred to warmed service plates.

Pancakes made from this experiment were comparable and indistinguishable from freshly made pancakes made from the control formulation in size, mass, browning, texture, and taste.

The results appear to indicate that the microencapsulated sodium bicarbonate kept isolated and dispersed within the oil layer, and therefore above the acidified batter, produced a liquid batter that was very stable and mold resistant over the period of 12 weeks in both the refrigerated and room temperature storage conditions. The OST-9361-01 sample of encapsulated sodium bicarbonate was chosen because it provided a low release melting temperature for the microcapsule shell at about 117° F. and possessed a high active loading (70%). This test appears to indicate that the batter will remain stable whether the encapsulated base-leavening agent is immersed within the oil isolation layer, or placed above the oil layer.

SAMPLE BATTER USING RAW MICRONIZED SODIUM BICARBONATE PLACED WITHIN OIL ISOLATOR LAYER IN CONTAINER
A batter was developed according to the following recipe:

| INGREDIENT | MIX RATIO BY WT-% |
|---|---|
| Flour (Gold Medal General Purpose Bleached Flour) | 34.8% |
| Sugar | 1.9% |
| Non-fat Dry Milk | 3.3% |
| Liquid vegetable oil | 3.0% |
| Water | 44.1% |
| Stabilized egg powder | 11.6% |
| SAPP-23 in Raw form (FMC Corp.) | 0.6% |
| Raw Sodium Bicarbonate (USP-1 from FMC Corp., micronized to < 10 microns) | 0.8% |
| Lactic Acid | 0% |
| Polyoxethylene Sorbitan Monooleate | 0.2 cc |

The batter was prepared in accordance with the following procedure. The flour, sugar (dextrose), and dry milk powder were gently mixed. The stabilized egg yolk powder, SAPP-23, polyoxethylene sorbitan monooleate and water were mixed and gently stirred to form a homogenous blend. These two resultants were mixed for 2 minutes at low speed in a Hobart mixer. A liquid, pourable batter results.

Micronized sodium bicarbonate was prepared using a jet mill to produce particulates sized between 5 and 10 microns. This dry powder micronized sodium bicarbonate was added to the liquid vegetable oil and stirred until dispersed in a homogeneous fashion. Particles were observed to be suspended in the oil mix.

The batter was added to a container, and the liquid vegetable oil/micronized sodium bicarbonate mixture added over the liquid batter. The container was sealed and stored in refrigeration, while another sample was stored at room temperature.

Twelve samples were taken and tested at one-week intervals. Six samples were refrigerated in a conventional household refrigerator in the refrigeration section while six samples were sealed in a plastic jar and placed on a shelf in a laboratory. The batter's pH level was tested after 24 hours and that value was compared to the pH level over time. In each case the pH level was found to remain stable close to the planned pH level of 5.5.

| SAMPLE | pH after 24 hrs. Refrigerated | pH after 12 weeks Refrigerated | pH after 12 weeks Room temp. |
|---|---|---|---|
| 25. | 5.7 | 5.8 | 6.2 |
| 26. | 5.5 | 5.5 | 6.1 |
| 27. | 5.5 | 5.6 | 6.0 |
| 28. | 5.3 | 5.3 | 5.9 |
| 29. | 5.6 | 5.7 | 5.9 |
| 30. | 5.5 | 5.7 | 6.3 |

The resulting food product was then prepared for consumption in accordance with the following procedure.

The container containing the ready to use pancake batter prepared in accordance with this invention was agitated, e.g. shaken vigorously. The ready to use batter was placed in a griddle or skillet, preheated to 200° F. and cooked for 2 minutes on one side, or until the surface leavens and browns.

The pancakes were turned to the other side and cooked for approximately 1–2 minutes more, or until the underside is golden brown.

The resulting pancakes were transferred to warmed service plates.

Pancakes made from this experiment were comparable and indistinguishable from freshly made pancakes made from the control formulation in size, mass, browning, texture, and taste.

The results appear to indicate that micronized sodium bicarbonate kept isolated and dispersed within the oil layer, and therefore above the acidified batter produced a liquid batter that was very stable and mold resistant over the period of 12 weeks in both the refrigerated and room temperature storage conditions. The small particle size for the micronized sodium bicarbonate was chosen to provide easier dispersion and suspension within the oil isolator layer.

This test appears to indicate that the batter will remain stable even if raw unencapsulated base leavening agent is immersed within the oil isolation layer. It should be noted that the concentration level, particle size and dispersion characteristics may be carefully considered when using raw micronized leavening base dispersed within an oil separator layer to prevent the base leavening agent from separating from the oil, and thereby reacting with the acidified batter in storage.

SAMPLE BATTER USING ENCAPSULATED SODIUM
BICARBONATE AND ENCAPSULATED ACIDULANT
PLACED ABOVE OIL ISOLATOR LAYER IN CONTAINER
FOR THE PURPOSE OF PROVIDING EXTENDED SHELF LIFE
A batter was developed according to the following recipe:

| INGREDIENT | MIX RATIO BY WT-% |
|---|---|
| Flour (Gold Medal General Purpose Bleached Flour) | 34.8% |
| Sugar | 1.9% |
| Non-fat Dry Milk | 3.3% |
| Liquid vegetable oil (TRISUN HS 500, A.C. Humko Co.) | 3.0% |
| Water | 44.1% |
| Stabilized egg powder | 11.6% |
| SAPP-23 in Raw form (FMC Corp.) | 0.2% |
| Encapsulated Sodium Bicarbonate Model No: OST-9361-01 | 0.8% |
| Encapsulated SAPP-23 Model No: OST-0010-01 | 0.3% |
| Lactic Acid | 0.1% |
| Polyoxethylene Sorbitan Monooleate | 0.2 cc |

The batter was prepared in accordance with the following procedure. The flour, sugar (dextrose), and dry milk powder were gently mixed. The stabilized egg yolk powder, SAPP-23, polyoxethylene sorbitan monooleate and water were gently mixed and stirred to form an homogenous blend. These two resultants were mixed for 2 minutes at low speed in a Hobart mixer. A liquid, pourable batter results. The batter was added to a container and the liquid vegetable oil then added over the liquid batter. The encapsulated sodium bicarbonate/and encapsulated SAPP were dry blended. The resulting dry powder encapsulated sodium bicarbonate/encapsulated SAPP blend was then added over the liquid vegetable oil. Encapsulated product was observed to float above the oil, and was effectively isolated away from the acidulated batter.

The container was sealed with one sample being stored in refrigeration and another at room temperature.

Twelve samples were taken and tested at one-week intervals. Six samples were refrigerated in a conventional household refrigerator in the refrigeration section while six samples were sealed in a plastic jar and placed on a shelf in the laboratory. The batter's pH level was tested after 24 hours and that value was compared to the pH level over time. In each case the pH level was found to remain stable, close to the planned pH level of 5.5.

| SAMPLE | pH after 24 hrs. Refrigerated | pH after 24 weeks Refrigerated | pH after 24 weeks Room temp. |
|---|---|---|---|
| 31. | 5.7 | 5.9 | 5.9 |
| 32. | 5.5 | 5.5 | 5.5 |
| 33. | 5.5 | 5.8 | 6.1 |
| 34. | 5.3 | 5.3 | 5.3 |
| 35. | 5.6 | 5.6 | 5.6 |
| 36. | 5.5 | 5.7 | 5.9 |

The resultant product was prepared for consumption in accordance with the following procedure.

The container containing the ready to use pancake batter prepared in accordance with this invention was agitated, e.g. vigorously shaken. The ready to use batter was then placed in a griddle or skillet, preheated to 200° F., and cooked for 2 minutes on one side, or until the surface leavens and browns. The pancakes are then turned to the other side and cooked for approximately 1–2 minutes more, or until the underside is golden brown. The pancakes were then transferred to warmed service plates.

Pancakes made from this experiment were comparable and indistinguishable from freshly made pancakes made from the control formulation in size, mass, browning, texture, and taste. Pancakes made from after 24 hours were observed to have larger dimensions than the control pancakes. This volume gain decreased after 24 weeks, but was observed at that time to be comparable with the control pancake dimensions.

These results appear to indicate that the microencapsulated sodium bicarbonate kept isolated and above the acidified batter produced a liquid batter that was very stable and mold resistant over the period of 24 weeks in both the refrigerated and room temperature storage conditions. The OST-9361-01 sample of encapsulated sodium bicarbonate and OST-0010-01 sample of encapsulated SAPP-23 were both chosen because they provided a low release melt temperature for the microcapsule shell at about 117° F. and possessed a high active loading (70%).

It is believed that the use of encapsulated SAPP, also isolated from direct contact within the acidified batter affords an extra amount of acidulant during leavening after extended shelf life. If the encapsulated SAPP were stored within the acidified batter it's shell may tend to degrade and it would lose its potency. In the above experiments, a portion of the acidulant within the liquid batter acts as both a antimicrobial agent and a leavening agent. A quantity of the acidulant loses its potency in its antimicrobial function such that during extended shelf life the leavening potency suffers. By providing encapsulated acidulant the acidic portion of the leavening can be restored during the cooking process when the capsule releases.

While the above examples were illustrated in connection with pancake products, it should be understood that other formulations are possible for use in other food products, including without limitation, loaf breads, snack foods, and other higher volume products such as muffins, breads, microwave cakes and other baked goods. For example, sample no's OST-9351-01 and OST-9351-02 provide a high temperature release at approximately 135–140° F. for encapsulated sodium bicarbonate, while sample no. OST-0011-01 provides substantially the same release character for encapsulated SAPP-23. It is believed that the internal temperature of a baked good during the cooking process determines when the capsule coating material will release its content. In the instance of pancakes, and other short bake cycle products, the internal temperate can reach from 112–120° F. in just 1–2 minutes. In loaf breads the internal temperature can reach 135–150° F. within 10–20 minutes in a conventional oven. It may therefore be necessary to design a baked product employing a liquid batter or dough as described in this invention based upon its baking requirements and the effect or time and temperature upon any controlled release ingredients within the liquid batter or dough product.

Applicants have also observed that the size of the microencapsulated particulates may be important to proper uniform leavening function. If the microspheres are too large, there may tend to be a discoloration in the final baked product. It may therefore be desirable for the microencapsulated components to be below about 60 mesh or about 250 microns.

The above examples illustrate the stability of the liquid batter formulations from a standpoint of pH. It is believed that if the pH was not stable within the liquid batter there would be an indication of a loss in potency of the alkali acidulant reaction upon leavening, and indeed if the pH were significantly increased during shelf storage this would indicate the capsules of sodium bicarbonate were leaking over time, robbing the formulation of its antimicrobial capability.

The following examples further show the microbial effect of prolonged shelf life using these liquid batter system. The premise was that prolonged shelf stability necessitated a stable or constantly lowering microbial count within the stored liquid batter. If the microbial count increased significantly over time, this would indicate that the batter had spoiled and was no longer suitable for consumption. If the use of an oil isolator layer within a liquid batter, coupled with microencapsulated leavening agents, for example, were capable of providing extended shelf life, the microbial count would remain low throughout the shelf study period.

EXEMPLARY PREPARATION OF LIQUID BATTER FOR MICROBIAL SHELF LIFE STUDY (MICROBIAL SAMPLE 1)

| Ingredient | Source | Grams | mix % |
|---|---|---|---|
| All Purpose Flour | Acme Markets | 200 | 30.5% |
| Nutrisoy | Archer Daniels Midland Corp. | 16.39 | 2.5% |
| Instant Pure Flo (baka-snack) | National Starch | 9.18 | 1.4% |
| Granulated Sugar | American Fare | 12.46 | 1.9% |
| Salt | Morton Salt Co. | 7.87 | 1.2% |
| Non-Fat Dried Milk | Acme Markets | 32.79 | 5.0% |
| Shortening-Trisun HS-500 | AC Humko Inc. | 19.67 | 3.0% |
| Dried Whole Egg Powder | Sonestegard Foods | 30.16 | 4.6% |
| DMG-130 | Archer Daniels Midland Corp. | 6.56 | 1.0% |
| Panalite-90 DK | Archer Daniels Midland Corp. | 6.56 | 1.0% |
| Sorbic Acid | | 1.97 | 0.3% |
| Calcium Propionate | | 1.97 | 0.3% |
| Sodium Bicarbonate Capsules (OST-9362-01) | Encapsulation Systems, Inc. | 9.84 | 1.5% |
| SAPP-28 | FMC Corp. | 6.56 | 1.0% |
| Water (tap) | | 293.77 | 44.9% |
| Total | | 655.75 | 100.2% |

A method for making the above product is set forth as follows. Make a solution of 0.3% citric acid and 0.3% ascorbic acid in water (having a pH of about 2.0). Dry-mix all of the remaining ingredients together except the oil and encapsulated sodium bicarbonate. Add sodium bicarbonate capsules and oil together by gently mixing into a homogeneous blend. Add mixture of capsules and Trisun HS-500 to dry mix. Add acid solution to dry mix/oil mixture. Store in a container, in a refrigerator, for example. The resulting batter may have a pH of batter of approximately 4.0 to 4.2.

EXEMPLARY PREPARATION OF LIQUID BATTER FOR MICROBIAL SHELF LIFE STUDY (MICROBIAL SAMPLE 2)

| Ingredient | Source | Grams | mix % |
|---|---|---|---|
| All Purpose Flour | Acme Markets | 200 | 30.5% |
| Nutrisoy | Archer Daniels Midland Corp. | 13.11 | 2.0% |
| Instant Pure Flo(baka-snack) | National Starch | 3.28 | 0.5% |
| Granulated Sugar | American Fare Corp. | 12.5 | 1.9% |
| Salt | Morton Salt Co. | 7.9 | 1.2% |
| Non-Fat Dried Milk | Acme Markets | 32.8 | 5.0% |
| Shortening-Trisun HS-500 | AC Humko Inc. | 26.23 | 4.0% |
| Dried Whole Egg Powder | Sonestegard Foods | 29.5 | 4.5% |
| DMG-80 | Archer Daniels Midland Corp. | 3.28 | 0.5% |
| Panalite-90 DK | Archer Daniels Midland Corp. | 6.56 | 1.0% |
| Sorbic Acid | | 1.97 | 0.3% |
| Calcium Propionate | | 1.97 | 0.3% |
| Sodium Bicarbonate Capsules (OST-9362-02) | Encapsulation Systems, Inc. | 9.84 | 1.5% |
| SAPP-28 | FMC Corp. | 6.56 | 1.0% |
| DMG-130 | Archer Daniels Midland Corp. | 3.28 | 0.5% |
| Performix-E | Archer Daniels Midland Corp. | 3.28 | 0.5% |
| Ultralec-F | Archer Daniels Midland Corp. | 6.56 | 1.0% |
| Water (tap) | | 287.21 | 43.8% |
| Total | | 655.83 | 100.0% |

Such a product can be prepared in accordance with the following steps. Make a solution of 0.3% citric acid and 0.3% ascorbic acid in water (having a pH of about 2.0). Dry-Mix all of the remaining ingredients together except for the oil and encapsulated sodium bicarbonate. Add the sodium bicarbonate capsules and oil together gently mixing them into homogeneous blend. Add the mixture of capsules and Trisun HS-500 to the resultant dry mix. Add the acid solution to the dry mix and oil resultant. The resulting product can be stored in a container, and refrigerated, for example. The pH of the resultant batter may be approximately 4.0 to 4.2, for example.

EXEMPLARY PREPARATION OF LIQUID BATTER FOR MICROBIAL SHELF LIFE STUDY (MICROBIAL SAMPLE 3)

| Ingredient | Source | grams | mix % |
|---|---|---|---|
| All Purpose Flour | Acme Markets | 400 | 30.5% |
| Nutrisoy | Archer Daniels Midland Corp. | 26.23 | 2.0% |
| Pure Gel Starch, B-990 | GPC | 13.12 | 1.0% |
| Granulated Sugar | American Fare Corp. | 24.92 | 1.9% |
| Salt | Morton Salt Co. | 15.74 | 1.2% |
| Non-Fat Dried Milk | Acme Markets | 65.58 | 5.0% |
| Shortening-Trisun HS-500 | AC Humko Inc. | 52.46 | 4.0% |

EXEMPLARY PREPARATION OF LIQUID BATTER FOR MICROBIAL SHELF LIFE STUDY (MICROBIAL SAMPLE 3) -continued

| Ingredient | Source | grams | mix % |
|---|---|---|---|
| Dried Whole Egg Powder | Sonestegard Foods | 59.02 | 4.5% |
| DMG-80 | Archer Daniels Midland Corp. | 13.12 | 1.0% |
| Panalite-90 DK | Archer Daniels Midland Corp. | 13.12 | 1.0% |
| Sorbic Acid | | 3.94 | 0.3% |
| Calcium Propionate | | 3.94 | 0.3% |
| Sodium Bicarbonate Capsules (OST-9362-02) | Encapsulation Systems, Inc. | 19.67 | 1.5% |
| SAPP-28 | FMC Corp. | 13.12 | 1.0% |
| Performix-E | Archer Daniels Midland Corp. | 13.12 | 1.0% |
| Ultralec-F | Archer Daniels Midland Corp. | 13.12 | 1.0% |
| Water (tap) | | 561.32 | 42.8% |
| Total | | 1311.54 | 100.0% |

Such a preparation can be made in accordance with the following method. Make a solution of 0.3% citric acid and 0.3% ascorbic acid in water (having a pH around 2.0). Dry-Mix all of the remaining ingredients together, except for the oil and encapsulated sodium bicarbonate. Add the sodium bicarbonate capsules and oil together by gently mixing them into a homogeneous blend. Add the mixture of capsules and Trisun HS-500 to the resultant dry mix. Add the acid solution to the dry mix and oil resultant. The resulting product can be stored in a container, and refrigerated, for example. The batter may have a pH of batter of about 4.0 to 4.2.

EXEMPLARY PREPARATION OF LIQUID BATTER FOR MICROBIAL SHELF LIFE STUDY (MICROBIAL SAMPLE 4)

| Ingredient | Source | Grams | mix % |
|---|---|---|---|
| All Purpose Flour | Acme Markets | 100 | 30.3% |
| Nutrisoy | Archer Daniels Midland Corp. | 6.56 | 2.0% |
| Instant Pure Flo(baka-snack) | National Starch | 3.28 | 1.0% |
| Granulated Sugar | American Fare Corp. | 6.23 | 1.9% |
| Salt | Morton Salt Co. | 3.93 | 1.2% |
| Non-Fat Dried Milk | Acme Markets | 16.4 | 5.0% |
| Shortening-Trisun HS-500 | AC Humko Inc. | 16.4 | 5.0% |
| Dried Whole Egg Powder | Sonestegard Foods | 14.75 | 4.5% |
| DMG-80 | Archer Daniels Midland Corp. | 3.28 | 1.0% |
| Panalite-90 DK | Archer Daniels Midland Corp. | 3.28 | 1.0% |
| Sorbic Acid | | 0.98 | 0.3% |
| Calcium Propionate | | 0.98 | 0.3% |
| Sodium Bicarbonate Capsules (OST-9362-02) | Encapsulation Systems, Inc. | 4.92 | 1.5% |
| SAPP-28 | FMC Corp. | 1.64 | 0.5% |
| Ultra-Lec-F | Archer Daniels Midland Corp. | 3.28 | 1.0% |
| Water (tap) | | 143.6 | 43.6% |
| Total | | 329.51 | 100.0% |

The preceding product can be prepared in accordance with the following procedure. Make a solution of 0.3% citric acid and 0.3% ascorbic acid in water (having a pH of around 2.0). Dry-mix all of the remaining ingredients together, except for the oil and encapsulated sodium bicarbonate. The sodium bicarbonate capsules and oil are added together by gently mixing them into a homogeneous blend. The mixture of capsules and Trisun HS-500 is added to the dry mix. The acid solution is added to the dry mix/oil resultant. The resulting batter product can be stored in a container and refrigerated, for example. The resulting batter may have a pH of approximately 4.0 to 4.2.

PREPARATION OF CONTROL LIQUID BATTER FOR MICROBIAL SHELF LIFE STUDY

| Ingredient | Source | Grams | mix % |
|---|---|---|---|
| All Purpose Flour | Acme Markets | 100 | 37.0% |
| Non-Fat Dried Milk | | 9.43 | 3.5% |
| Dried Whole Egg Powder | | 33.43 | 12.4% |
| Polyethylene Sorbitan monooleate | | 0.2 | 0.1% |
| Water (tap) | | 127 | 47.0% |
| Total | | 270.06 | 100.0% |

This product may be prepared according to the following process. Mix all dry ingredients together, add water and stir.

Each of the above formulations and examples were prepared using similar mix procedures and the samples were then sent to an independent laboratory for microbial analysis. A commercial sample called "Fast Cakes" (Rich Foods) was obtained for comparison. This product was a dry mix of pancake batter in a container to which tap water is added to make ready dough. The samples were tested for the following microbial activity: aerobic plate count, coliforms, *E. coli*, yeast count and mold count. The tests were conducted by Lancaster Laboratories. Samples were taken from the same container, at the start of the run and every 2 weeks thereafter until week 9. The samples were refrigerated for the entire test period. Table-2 indicates the results.

TABLE 2

| WEEK | AEROBIC PLATE COUNT | COLIFORMS | E. COLI (less than) | YEAST COUNT (Less than) | MOLD COUNT |
|---|---|---|---|---|---|
| Microbial Sample no: 1 | | | | | |
| 0 | 180 | 9 | 3 | 10 | 20 |
| 2 | 130 | 3 | 3 | 10 | 10 |
| 4 | 200 | 3 | 3 | 10 | 10 |
| 7 | 10 | 3 | 3 | 10 | 15 |
| 9 | 10 | 3 | 3 | 3 | 10 |
| Average | 106 | 4 | 3 | 9 | 13 |
| Microbial Sample no: 2 | | | | | |
| 0 | 30 | 3 | 3 | 10 | 10 |
| 2 | 80 | 4 | 3 | 10 | 10 |
| 4 | 110 | 3 | 3 | 10 | 20 |
| 7 | 40 | 3 | 3 | 10 | 10 |
| 9 | 50 | 3 | 3 | 10 | 10 |
| Average | 62 | 3.2 | 3 | 10 | 12 |
| Microbial Sample no: 3 | | | | | |
| 0 | 220 | 4 | 3 | 10 | 45 |
| 2 | 160 | 4 | 3 | 10 | 20 |
| 4 | 190 | 3 | 3 | 10 | 25 |
| 7 | 10 | 3 | 3 | 10 | 10 |
| 9 | 10 | 3 | 3 | 10 | 10 |
| Average | 118 | 3.4 | 3 | 10 | 22 |

TABLE 2-continued

| WEEK | AEROBIC PLATE COUNT | COLIFORMS | E. COLI (less than) | YEAST COUNT (Less than) | MOLD COUNT |
|---|---|---|---|---|---|
| Microbial Sample no: 4 | | | | | |
| 0 | 880 | 3 | 3 | 10 | 45 |
| 2 | 480 | 3 | 3 | 10 | 25 |
| 4 | 600 | 3 | 3 | 10 | 10 |
| 7 | 430 | 3 | 3 | 10 | 15 |
| 9 | 2400 | 3 | 3 | 10 | 20 |
| Average | 958 | 3 | 3 | 10 | 23 |
| Microbial Sample no: control mix | | | | | |
| 0 | 14,000 | 93 | 3 | 10 | 160 |
| 2 | 100 | 3 | 3 | 10 | 40 |
| 4 | 0 | 0 | 0 | 0 | 0 |
| 6 | 0 | 0 | 0 | 0 | 0 |
| 9 | 0 | 0 | 0 | 0 | 0 |
| Average | 14,000 | 93 | 3 | 10 | 160 |
| Microbial Sample no: Fast-Cakes | | | | | |
| 0 | 3,700 | 240 | 3 | 10 | 930 |
| 2 | 360,000 | 23 | 3 | 10 | 550 |
| 4 | 0 | 0 | 0 | 0 | 0 |
| 6 | 0 | 0 | 0 | 0 | 0 |
| 9 | 0 | 0 | 0 | 0 | 0 |
| Average | 360,000 | 23 | 3 | 10 | 550 |

Although the invention, descriptions, examples and data have been discussed and pictured in a preferred form and with a certain degree of particularity, it is understood that numerous changes in the details of construction and combination and arrangement of parts and steps may be made without departing from the spirit and scope of the invention as in hereinafter claimed.

What is claimed is:

1. A ready-to-use food product being suitable for storage in a container, said product comprising:
   a batter;
   at least one leavening agent;
   at least one oil;
   wherein, said oil separates said batter and leavening agent while stored in said container, and agitation causes said batter, leavening agent and oil to at least partially admix; and
   wherein said at least one leavening agent is at least partially coated.

2. The product of claim 1, wherein said at least partially coated leavening agent is at least partially coated with a fatty material.

3. The product of claim 1, wherein said at least partially coated leavening agent is at least partially coated with an edible fat, wax, or hydrogenated vegetable oil.

4. A ready-to-use food product being suitable for storage in a container, said product comprising:
   a batter;
   at least one leavening agent;
   at least one oil;
   wherein, said oil separates said batter and leavening agent while stored in said container, and agitation causes said batter, leavening agent and oil to at least partially admix; and
   wherein said leavening agent is generally alkaline and further comprises a plastic hydrogenated shortening and a fat as an at least partial coating material.

5. A ready-to-use food product being suitable for storage in a container, said product comprising:
   a batter;
   at least one leavening agent;
   at least one oil;
   wherein, said oil separates said batter and leavening agent while stored in said container, and agitation causes said batter, leavening agent and oil to at least partially admix; and
   wherein said leavening agent comprises an encapsulated acidulant selected from the group consisting of monocalcium phosphate, monocalcium phosphate anhydrous, sodium acid pyrophosphate, sodium aluminum pyrophosphate, dicalcium phosphate dihydrate, dicalcium phosphate, sodium aluminum sulfate, glucondelta-lactone, and potassium hydrogen tartrate.

6. A ready-to-use food product being suitable for storage in a container, said product comprising:
   a batter;
   at least one leavening agent;
   at least one oil;
   wherein, said oil separates said batter and leavening agent while stored in said container, and agitation causes said batter, leavening agent and oil to at least partially admix; and
   wherein said leavening agent comprises an encapsulated acidulant comprising a baking acid.

7. A method for preparing a storable culinary product, said method comprising:
   adding an aqueous unleavened batter having an effective pH below about 5.5 to a container;
   forming a layer of oil above the aqueous acidified batter in said container; and,
   adding an edible alkaline leavening agent above said oil layer within said container, said leavening agent being encapsulated in a normally water-insoluble, edible material, and in a quantity sufficient to raise the batter upon cooking into a final cooked culinary product.

8. The method of claim 7, wherein said alkaline leavening agent comprises sodium bicarbonate.

9. The method of claim 7, wherein the edible material encapsulating said leavening agent comprises an edible fat, wax, or hydrogenated vegetable oil.

10. The method of claim 7, wherein said edible material comprises a plastic hydrogenated shortening and a fat.

11. The method of claim 7, further comprising adding an edible fungistatic agent to said batter.

12. The method of claim 11, wherein the edible fungistatic agent comprises sorbic acid.

13. The method of claim 7, wherein said pH of said batter is in a range of about 3.9 to about 5.5.

14. The method of claim 7, wherein said batter comprises a mixture of flour, eggs, sugar and milk solids.

15. A method for preparing a storable culinary product, said method comprising:
   forming an aqueous unleavened batter;
   adding an edible acid to said batter so as to lower a pH of said batter to below about 5.5; placing said batter in a container;
   forming a layer of oil above the aqueous, acidified batter in said container; and, adding an edible alkaline leavening agent to said oil layer;
   wherein, said leavening agent is encapsulated in a normally water-insoluble edible material, and is in a quantity sufficient to raise the batter upon cooking into a final cooked culinary product.

16. The method of claim 15, wherein said alkaline leavening agent comprises sodium bicarbonate.

17. The method of claim 15, wherein the edible material encapsulating said leavening agent comprises an edible fat, wax or hydrogenated vegetable oil.

18. The method of claim 15, wherein said edible material comprises a plastic hydrogenated shortening and a fat as the encapsulating material.

19. The method of claim 15, further comprising adding an edible fungistatic agent to said batter.

20. The method of claim 19, wherein the edible fungistatic agent comprises sorbic acid.

21. The method of claim 15, wherein said pH of said batter is in a range of about 3.9 to about 5.5.

22. The method of claim 15, wherein said batter comprises a mixture of flour, eggs, sugar and milk solids.

23. A method for preparing a storable culinary product, said method comprising: forming an aqueous unleavened batter;
    adding an edible acid to said batter so as to lower a pH of said batter to below about 5.5;
    placing said batter in a container;
    forming a layer of oil above the aqueous, acidified batter in said container, and adding an encapsulated edible alkaline leavening agent and encapsulated acidulant each of a sufficiently small particle size to enable the leavening agent and encapsulated acidulant to remain substantially dispersed and suspended within the oil layer, to said oil layer;
    wherein, said alkaline leavening agent is in a quantity sufficient to raise the batter upon cooking into a final cooked culinary product.

24. The method of claim 23, wherein said alkaline leavening agent comprises sodium bicarbonate.

25. The method of claim 23, wherein said encapsulated acidulant comprises a leavening acid selected from the group consisting of monocalcium phosphate (MCP), monocalcium phosphate anhydrous (AMCP), sodium acid pyrophosphate (SAPP), sodium aluminum pyrophosphate (SALP), dicalcium phosphate dihydrate (DPD), dicalcium phosphate (DCP), sodium aluminum sulfate (SAS), glucon-delta-lactone (GDL), potassium hydrogen tartrate (cream of tartar) and baking acid.

26. The method of claim 25, further comprising adding an edible fungistatic agent to said batter.

27. The method of claim 26, wherein the edible fungistatic agent comprises sorbic acid.

28. The method of claim 26, wherein said pH of said batter is in a range of about 3.9 to about 5.5.

29. The method of claim 23, wherein said batter comprises a mixture of flour, eggs, sugar and milk solids.

30. A method for preparing a storable culinary product, said method comprising:
    forming an aqueous unleavened batter,
    adding an edible acid to said batter so as to lower a pH of said batter to below about 5.5;
    placing said batter in a container;
    forming a layer of oil above the aqueous, acidified batter in the container; and, adding an encapsulated edible alkaline leavening agent and encapsulated acidulant above said oil layer in said container.

31. The method of claim 30, wherein said alkaline leavening agent comprises sodium bicarbonate.

32. The method of claim 30, wherein said encapsulated acidulant comprises at least one leavening acid selected from the group consisting essentially of monocalcium phosphate (MCP), monocalcium phosphate anhydrous (AMCP), sodium acid pyrophosphate (SAPP), sodium aluminum pyrophosphate (SALP), dicalcium phosphate dihydrate (DPD), dicalcium phosphate (DCP), sodium aluminum sulfate (SAS), glucondelta-lactone (GDL), potassium hydrogen tartrate (cream of tartar) and baking acid.

33. The method of claim 32, further comprising adding at least one edible fungistatic agent to said batter.

34. The method of claim 33, wherein said at least one edible fungistatic agent comprises sorbic acid.

35. The method of claim 30, wherein said pH of said batter is in a range of about 3.9 to about 5.5.

36. The method of claim 30, wherein said batter comprises a mixture of flour, eggs, sugar and milk solids.

37. The method of claim 36, wherein said encapsulated alkaline leavening agent is sized below about 250 microns.

38. A food product comprising:
    a batter;
    oil;
    at least one leavening agent;
    wherein, when stored in a container, in a first state said oil substantially isolates said at least one leavening agent from said batter, and in a second state, said at least one leavening agent, oil and batter are at least partially admixed; and
    wherein said at least one leavening agent is at least partially coated.

39. The product of claim 38, wherein said at least partially coated leavening agent is at least partially coated with a fatty material.

40. The product of claim 38, wherein said at least partially coated leavening agent is at least partially coated with an edible fat, wax, or hydrogenated vegetable oil.

41. A food product comprising:
    a batter;
    oil;
    at least one leavening agent;
    wherein, when stored in a container, in a first state said oil substantially isolates said at least one leavening agent from said batter, and in a second state, said at least one leavening agent, oil and batter are at least partially admixed;
    wherein said leavening agent comprises sodium bicarbonate; and
    wherein said leavening agent is at least partially encapsulated using a plastic hydrogenated shortening and a fat.

42. A food product comprising:
    a batter;
    oil;
    at least one leavening agent;
    wherein, when stored in a container, in a first state said oil substantially isolates said at least one leavening agent from said batter, and in a second state, said at least one leavening agent, oil and batter are at least partially admixed; and
    wherein said leavening agent comprises an encapsulated acidulant selected from the group consisting of monocalcium phosphate, monocalcium phosphate anhydrous, sodium acid pyrophosphate, sodium aluminum pyrophosphate, dicalcium phosphate dihydrate, dicalcium phosphate, sodium aluminum sulfate, glucondelta-lactone, and potassium hydrogen tartrate.

43. A food product comprising:
    a batter;
    oil;
    at least one leavening agent;
    wherein, when stored in a container, in a first state said oil substantially isolates said at least one leavening agent from said batter, and in a second state, said at least one leavening agent, oil and batter are at least partially admixed; and
    wherein said leavening agent comprises an encapsulated acidulant comprising a baking acid.

* * * * *